(12) United States Patent
Zhao et al.

(10) Patent No.: US 11,528,697 B2
(45) Date of Patent: Dec. 13, 2022

(54) PHYSICAL UPLINK SHARED CHANNEL PUSCH TRANSMISSION METHOD AND APPARATUS

(71) Applicant: Huawei Technologies Co., Ltd., Shenzhen (CN)

(72) Inventors: Yue Zhao, Beijing (CN); Zheng Yu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 16/990,581

(22) Filed: Aug. 11, 2020

(65) Prior Publication Data

US 2020/0374846 A1    Nov. 26, 2020

Related U.S. Application Data

(63) Continuation of application No. PCT/CN2018/076781, filed on Feb. 13, 2018.

(51) Int. Cl.
*H04W 72/04* (2009.01)
*H04W 72/12* (2009.01)

(52) U.S. Cl.
CPC ..... *H04W 72/042* (2013.01); *H04W 72/0446* (2013.01); *H04W 72/1289* (2013.01)

(58) Field of Classification Search
CPC ......... H04W 72/1289; H04W 72/0446; H04W 72/042

(Continued)

(56) References Cited

U.S. PATENT DOCUMENTS 10,554,365 B2 *  2/2020  Lee ................. H04L 5/0091
2015/0078224 A1  3/2015  Xiong et al.
(Continued)

FOREIGN PATENT DOCUMENTS

CN    106559188 A    4/2017
CN    107046722 A    8/2017
(Continued)

OTHER PUBLICATIONS

Intel Corporation, "HARQ-ACK feedback for efeMTC UL transmission", 3GPP TSG RAN WG1 Meeting #89, R1-1707316, Hangzhou, P.R. China, May 15-19, 2017, 14 pages.

(Continued)

*Primary Examiner* — Peter G Solinsky
(74) *Attorney, Agent, or Firm* — Slater Matsil, LLP

(57) ABSTRACT

A method includes: receiving, by a terminal, a MPDCCH, where the MPDCCH includes a quantity of repeated sending times of the MPDCCH and timing indication information; determining a time domain location of a first subframe based on the quantity of repeated sending times of the MPDCCH, where the first subframe is the last subframe that carries the MPDCCH; determining a time domain location of a second subframe based on the timing indication information and the time domain location of the first subframe, where the second subframe is a start subframe that carries a PUSCH corresponding to the MPDCCH, a resource allocation granularity of the PUSCH corresponding to the MPDCCH is a target resource unit, and a quantity of subcarriers occupied by the target resource unit in frequency domain is less than or equal to 12; and sending, in the second subframe, the PUSCH corresponding to the MPDCCH.

20 Claims, 8 Drawing Sheets

(58) Field of Classification Search
USPC .......................................................... 370/329
See application file for complete search history.

(56) References Cited

U.S. PATENT DOCUMENTS

| 2015/0245323 | A1 | 8/2015 | You et al. | |
|---|---|---|---|---|
| 2017/0245265 | A1 | 8/2017 | Hwang et al. | |
| 2017/0273113 | A1* | 9/2017 | Tirronen | H04W 72/0446 |
| 2018/0084561 | A1* | 3/2018 | Liu | H04W 4/70 |
| 2018/0103459 | A1* | 4/2018 | Liu | H04L 1/08 |
| 2020/0015192 | A1* | 1/2020 | Chun | H04W 76/27 |
| 2020/0213976 | A1* | 7/2020 | Kim | H04W 4/70 |

FOREIGN PATENT DOCUMENTS

| WO | 2017026548 A1 | 2/2017 |
|---|---|---|
| WO | 2017121416 A1 | 7/2017 |

OTHER PUBLICATIONS

Huawei et al., "Data channel transmission for MTC UEs", 3GPP TSG RAN WG1 Meeting #80, R1-150040, Athens, Greece, Feb. 9-13, 2015, 4 pages.

Panasonic, "Start timing indication method of NB-PDSCI and NB-PUSCH", 3GPP TSG EAN WG1 NB-IoT Ad Hoc Meeting, R1-161921, Sophia Antipolis, France, Mar. 22-24, 2016, 4 pages.

Nokia et al., "Remaining details on PUSCH enhancement for VoLTE", 3GPP TSG RAN WG1 Meeting #88, R1-1701865, Athens, Greece, Feb. 13-17, 2017, 3 pages.

ZTE, "Remaining issues on VoLTE enhancement for FeMTC," 3GPP TSG RAN WG1 Meeting#88, R1-1701905, Athens, Greece, Feb. 13-17, 2017, 4 pages.

Huawei, "Correction on higher layer parameter for eVoLTE," 3GPP TSG RAN WG1 Meeting#91, R1-1719507, Reno, NV, USA, Nov. 27-Dec. 1, 2017, 24 pages.

* cited by examiner

PHYSICAL UPLINK SHARED CHANNEL PUSCH TRANSMISSION METHOD AND APPARATUS

CROSS-REFERENCE TO RELATED APPLICATIONS

This application is a continuation of International Application No. PCT/CN2018/076781, filed on Feb. 13, 2018, the disclosure of which is hereby incorporated by reference in its entirety.

TECHNICAL FIELD

This application relates to the field of wireless communications technologies, and in particular, to a physical uplink shared channel (PUSCH) transmission method and an apparatus.

BACKGROUND

Currently, in time division duplex (TDD) mode in a communications protocol, a resource scheduling granularity of a physical uplink shared channel (PUSCH) is a resource block (RB) in a machine type communication (MTC) system, and a relatively large quantity of subcarriers are occupied when the PUSCH is transmitted. Consequently, transmit power of a terminal on each carrier is relatively low.

In TDD mode, uplink data and downlink data are transmitted by occupying different subframes in time domain. Therefore, if a resource scheduling granularity similar to that of a narrowband physical uplink shared channel (NPUSCH) in frequency division duplex (FDD) mode is defined, a time domain location of the $1^{st}$ subframe in uplink subframes corresponding to a defined resource unit may be different from a time domain location of the 1st subframe in uplink subframes corresponding to a physical uplink shared channel (PUSCH), so that the uplink data is transmitted by occupying a relatively small quantity of subframes. Consequently, data transmission quality is relatively poor, and a resource waste is caused. For example, in a TDD uplink-downlink configuration manner 1, if it is defined that an RU occupies two subframes in time domain and occupies six subcarriers in frequency domain, when the last subframe that carries a machine physical downlink control channel (MPDCCH) is a subframe 4, a PUSCH corresponding to the MPDCCH is transmitted in a subframe 8. In this case, the PUSCH corresponding to the MPDCCH can be transmitted by occupying only the subframe 8. This is shown in FIG. 1.

SUMMARY

According to a first aspect, this application provides a PUSCH transmission method, to resolve a problem that when a resource allocation granularity of a PUSCH is a resource unit in TDD mode, uplink data transmission quality is not high and a resource is wasted because a time domain location of a start subframe that carries the PUSCH is different from a time domain location of the $1^{st}$ subframe occupied by the resource unit in time domain. The method includes: receiving, by a terminal, an MPDCCH sent by a PUSCH scheduling device, determining a time domain location of a first subframe based on a quantity of repeated sending times of the MPDCCH included in the MPDCCH, determining a time domain location of a second subframe based on timing indication information included in the MPDCCH and the time domain location of the first subframe, and sending, in the second subframe based on the time domain location of the second subframe, a PUSCH corresponding to the MPDCCH. The first subframe is the last subframe that carries the MPDCCH, the second subframe is a start subframe that carries the PUSCH corresponding to the MPDCCH, a resource allocation granularity of the PUSCH corresponding to the MPDCCH is a target resource unit, and a quantity of subcarriers occupied by the target resource unit in frequency domain is less than or equal to 12.

According to the foregoing method, the terminal receives the MPDCCH including the quantity of repeated sending times of the MPDCCH and the timing indication information, determines the time domain location of the first subframe based on the quantity of repeated sending times of the MPDCCH, and determines the time domain location of the second subframe based on the time domain location of the first subframe and the timing indication information, so that the time domain location of the start subframe that carries the PUSCH corresponding to the MPDCCH is the same as a time domain location of the $1^{st}$ subframe occupied by the target RU in time domain. Therefore, the terminal can fully use subframes occupied by the target RU to transmit the PUSCH corresponding to the MPDCCH, to ensure transmission quality of data carried on the PUSCH corresponding to the MPDCCH. The first subframe is the last subframe that carries the MPDCCH, and the second subframe is the start subframe that carries the PUSCH corresponding to the MPDCCH. The resource allocation granularity of the PUSCH corresponding to the MPDCCH is the target RU, and the quantity of subcarriers occupied by the target RU in frequency domain is less than or equal to 12. In addition, the terminal determines the time domain location of the second subframe based on the time domain location of the first subframe and the timing indication information, so that the time domain location of the start subframe that carries the PUSCH corresponding to the MPDCCH is the same as the time domain location of the $1^{st}$ subframe occupied by the target RU in time domain. Time domain locations of subframes that carry the MPDCCH do not need to be limited, so that the MPDCCH sent by the PUSCH scheduling device has relatively high flexibility.

In a possible implementation, the PUSCH scheduling device is a network side device or a terminal. When the PUSCH scheduling device is a network side device, the network side device sends the MPDCCH including the quantity of repeated sending times of the MPDCCH and higher layer signaling including the timing indication information. The terminal receives the higher layer signaling, and obtains the timing indication information from the higher layer signaling. The terminal determines the time domain location of the first subframe based on the quantity of repeated sending times of the MPDCCH, determines the time domain location of the second subframe based on the timing indication information and the time domain location of the first subframe, and sends, in the second subframe, the PUSCH corresponding to the MPDCCH.

In a possible implementation, when the timing indication information includes first location offset information, the terminal determines the time domain location of the second subframe based on the time domain location of the first subframe, the first location offset information, and a time domain location of a third subframe. The first location offset information indicates an offset of the time domain location of the second subframe relative to the time domain location of the third subframe, and the third subframe is a start subframe that is for sending the PUSCH and that is determined based on the time domain location of the first subframe when the resource allocation granularity of the PUSCH is a resource block RB.

In a possible implementation, when the timing indication information includes the first location offset information, before sending the MPDCCH, the PUSCH scheduling device further determines the time domain location of the first subframe based on the quantity of repeated sending times of the MPDCCH, determines the time domain location of the third subframe based on the time domain location of the first subframe, and determines the first location offset information based on the time domain location of the second subframe and the time domain location of the third subframe.

In a possible implementation, when the timing indication information includes second location offset indication information, the terminal determines the time domain location of the second subframe based on the time domain location of the first subframe and the second location offset information, where the second location offset information indicates an offset of the time domain location of the second subframe relative to the time domain location of the first subframe.

In a possible implementation, if the timing indication information includes the second location offset information, before sending the MPDCCH, the PUSCH scheduling device further determines the time domain location of the first subframe based on the quantity of repeated sending times the MPDCCH, and determines the second location offset information based on the time domain location of the first subframe and the time domain location of the second subframe.

In a possible implementation, when a first mapping relationship is configured in the terminal and the PUSCH scheduling device, the timing indication information may be used to indicate the terminal to determine the time domain location of the second subframe based on the first mapping relationship. The terminal determines the time domain location of the second subframe based on the time domain location of the first subframe and the first mapping relationship. The first mapping relationship is a correspondence between the time domain location of the first subframe and a location offset when the resource allocation granularity of the PUSCH is an RU, and the location offset is an offset of the time domain location of the second subframe relative to the time domain location of the first subframe.

In a possible implementation, the target resource unit includes one uplink subframe or a plurality of consecutive uplink subframes in time domain, so that subframes for transmitting the PUSCH corresponding to the MPDCCH are consecutive in time domain. Therefore, accuracy of channel estimation when the resource allocation granularity of the PUSCH in TDD mode is a resource unit can be improved.

In a possible implementation, a second mapping relationship is configured in the terminal and the PUSCH scheduling device, the second mapping relationship is a mapping relationship between an uplink-downlink configuration manner and a resource unit, and the PUSCH scheduling device is a device that sends the MPDCCH.

When an uplink-downlink configuration manner agreed on between the terminal and the PUSCH scheduling device corresponds to one resource unit in the second mapping relationship, the target resource unit is the resource unit corresponding to the uplink-downlink configuration manner agreed on between the terminal and the PUSCH scheduling device in the second mapping relationship; or when an uplink-downlink configuration manner agreed on between the terminal and the PUSCH scheduling device corresponds to a plurality of resource units in the second mapping relationship, the target resource unit is a resource unit selected by the PUSCH scheduling device from the plurality of resource units and notified to the terminal.

In a possible implementation, the second mapping relationship meets the following table:

| Time division duplex TDD uplink-downlink configuration manner | Resource unit |
|---|---|
| 0 | First resource unit and/or second resource unit |
| 1 | First resource unit and/or third resource unit |
| 2 | First resource unit |
| 3 | First resource unit and/or second resource unit |
| 4 | First resource unit and/or second resource unit |
| 5 | First resource unit |
| 6 | First resource unit |

The first resource unit occupies one subframe in time domain, the second resource unit occupies three subframes in time domain, and the third resource unit occupies two subframes in time domain.

In a possible implementation, a quantity M of subframes occupied by the target resource unit in time domain and a quantity N of subcarriers occupied by the target resource unit in frequency domain meet $|M \times N - 12| \leq a$, where M and N are positive integers, and a is an integer greater than or equal to 0, so that M×N is close to 12 as much as possible, to reduce impact on an information system architecture caused by transmitting the PUSCH at a resource allocation granularity of resource unit in TDD mode. In addition, compared with the prior art in which the PUSCH is transmitted at a resource allocation granularity of RB (occupying 12 subcarriers in frequency domain), in this application, when the terminal transmits the PUSCH by using a resource unit by which a quantity M of subframes occupied in time domain and a quantity N of subcarriers occupied in frequency domain meet $|M \times N - 12| \leq a$, the PUSCH occupies a relatively small quantity of subcarriers. Therefore, transmit power of the terminal on each subcarrier can be increased.

In a possible implementation, the target resource unit may occupy one subframe in time domain and occupy 12 subcarriers in frequency domain. Alternatively, the target resource unit may occupy two subframes in time domain and occupy six subcarriers in frequency domain. Alternatively, the target resource unit may occupy three subframes in time domain and occupy four subcarriers in frequency domain. Alternatively, the target resource unit may occupy four subframes in time domain and occupy three subcarriers in frequency domain. Alternatively, the target resource unit may occupy four subframes in time domain and occupy two subcarriers in frequency domain. Alternatively, the target resource unit may occupy six subframes in time domain and occupy two subcarriers in frequency domain. Alternatively, the target resource unit may occupy eight subframes in time domain and occupy two subcarriers in frequency domain.

In a possible implementation, the terminal may also send, to another terminal that can communicate with the terminal, an MPDCCH including a quantity of repeated sending times of the MPDCCH and the timing indication information, and schedule the another terminal that can communicate with the terminal to send, to the terminal, a PUSCH corresponding to the MPDCCH.

According to a second aspect, this application further provides another PUSCH transmission method, to resolve a problem that when a resource allocation granularity of a PUSCH in TDD mode is a resource unit, channel estimation performance is poor due to nonconsecutive subframes included in the resource unit. The method includes: receiving, by a terminal, resource unit type indication information sent by a PUSCH scheduling device, determining, based on the resource unit type indication information, a type of a target resource unit RU that carries a PUSCH, and sending the PUSCH based on the target RU type. The RU corresponding to the target RU type includes one uplink subframe or a plurality of consecutive uplink subframes in time domain, and a quantity of subcarriers occupied by the resource unit corresponding to the target RU type in frequency domain is less than or equal to 12.

According to the foregoing method, the terminal receives the resource unit RU type indication information sent by the PUSCH scheduling device, determines the target RU type based on the resource unit RU type indication information, and sends the PUSCH based on the target RU type. The RU corresponding to the target RU type includes one uplink subframe or a plurality of consecutive uplink subframes in time domain, and the quantity of subcarriers occupied by the resource unit corresponding to the target RU type in frequency domain is less than or equal to 12. In this way, the terminal sends the PUSCH by mapping the RU corresponding to the target RU type to one uplink subframe in a system frame or a plurality of consecutive uplink subframes in time domain, so that a problem of an inaccurate channel estimation result caused by nonconsecutive subframes included in a resource unit can be resolved.

In a possible implementation, the PUSCH scheduling device is another terminal that can communicate with the terminal or higher layer signaling. When the PUSCH scheduling device is another terminal that can communicate with the terminal, the PUSCH scheduling device may send the resource unit type indication information to the terminal through the MPDCCH. When the PUSCH scheduling device is a network side device, the PUSCH scheduling device may send the resource unit type indication information to the terminal through the MPDCCH or higher layer signaling.

In a possible implementation, when a mapping relationship between an uplink-downlink subframe configuration manner and a resource unit type is configured in the terminal, the terminal may determine the target RU type in the following two manners, but this is not limited.

Manner A: If uplink-downlink configuration manners one-to-one correspond to resource unit types in the mapping relationship, and the resource unit type indication information includes a target uplink-downlink subframe configuration manner, the terminal determines a resource unit type corresponding to the target uplink-downlink subframe configuration manner in the mapping relationship as the target RU type.

Manner B: If any uplink-downlink configuration manner corresponds to a plurality of resource unit types in the mapping relationship, and the resource unit type indication information includes a target uplink-downlink subframe configuration manner and target resource unit type indication information, the terminal determines, based on the target uplink-downlink subframe configuration manner and the mapping relationship, resource unit types corresponding to the target uplink-downlink subframe configuration manner, and determines, as the target RU type, a resource unit type that is in the resource unit types corresponding to the target uplink-downlink subframe configuration manner and that is indicated by the target resource unit type indication information.

In a possible implementation, the mapping relationship meets the following table:

| Time division duplex TDD uplink-downlink configuration manner | Resource unit type |
|---|---|
| 0 | First RU type and/or second RU type |
| 1 | First RU type and/or third RU type |
| 2 | First RU type |
| 3 | First RU type and/or second RU type |
| 4 | First RU type and/or second RU type |
| 5 | First RU type |
| 6 | First RU type |

An RU corresponding to the first RU type occupies one subframe in time domain, an RU corresponding to the second RU type occupies three subframes in time domain, and an RU corresponding to the third RU type occupies two subframes in time domain.

In a possible implementation, a quantity M of subframes occupied by the RU corresponding to the target RU type in time domain and a quantity N of subcarriers occupied by the RU corresponding to the target RU type in frequency domain meet $|M \times N - 12| \leq a$ where M and N are positive integers, and a is an integer greater than or equal to 0, so that $M \times N$ is close to 12 as much as possible, to reduce impact on an information system architecture caused by transmitting the PUSCH at a resource allocation granularity of resource unit in TDD mode. In addition, compared with the prior art in which the PUSCH is transmitted at a resource allocation granularity of RB (occupying 12 subcarriers in frequency domain), in this application, when the terminal transmits the PUSCH by using a resource unit by which a quantity M of subframes occupied in time domain and a quantity N of subcarriers occupied in frequency domain meet $|M \times N - 12| \leq a$, the PUSCH occupies a relatively small quantity of subcarriers. Therefore, transmit power of the terminal on each subcarrier can be increased.

In a possible implementation, a start subframe of the RU corresponding to the target RU type is the first uplink subframe in the system frame or the first uplink subframe in a slot.

According to a third aspect, this application provides a communications device, and the communications device has functions of implementing actions of the terminal in the method example of the first aspect. The functions may be implemented by hardware, or may be implemented by hardware by executing corresponding software. The hardware or software includes one or more modules corresponding to the foregoing functions.

In a possible implementation, a structure of the communications device includes a receiving unit, a processing unit, and a sending unit. These units can execute corresponding functions in the method example of the first aspect. For details, refer to the detailed descriptions in the method example. Details are not described herein again.

In a possible implementation, a structure of the communications device includes a transceiver, a memory, and a processor. The processor is configured to support the terminal in performing corresponding functions in the method of the first aspect. The memory is coupled to the processor and stores a program instruction and data that are necessary for the processor.

According to a fourth aspect, this application further provides a PUSCH scheduling device, and the PUSCH scheduling device has functions of implementing actions of the PUSCH scheduling device in the method example of the first aspect. The functions may be implemented by hardware, or may be implemented by hardware by executing corresponding software. The hardware or software includes one or more modules corresponding to the foregoing functions.

In a possible implementation, a structure of the PUSCH scheduling device includes a processing unit and a sending unit. These units can execute corresponding functions in the method example of the first aspect. For details, refer to the detailed descriptions in the method example. Details are not described herein again.

In a possible implementation, a structure of the PUSCH scheduling device includes a transceiver, a memory, and a processor. The processor is configured to support the PUSCH scheduling device in performing corresponding functions in the method example of the first aspect. The memory is coupled to the processor and stores a program instruction and data that are necessary for the processor.

According to a fifth aspect, this application further provides a communications device, and the communications device has functions of implementing actions of the terminal in the method example of the second aspect. The functions may be implemented by hardware, or may be implemented by hardware by executing corresponding software. The hardware or software includes one or more modules corresponding to the foregoing functions.

In a possible implementation, a structure of the communications device includes a receiving unit, a processing unit, and a sending unit. These units can execute corresponding functions in the method example of the second aspect. For details, refer to the detailed descriptions in the method example. Details are not described herein again.

According to a sixth aspect, this application further provides a PUSCH scheduling device, and the PUSCH scheduling device has functions of implementing actions of the PUSCH scheduling device in the method example of the second aspect. The functions may be implemented by hardware, or may be implemented by hardware by executing corresponding software. The hardware or software includes one or more modules corresponding to the foregoing functions.

In a possible implementation, a structure of the PUSCH scheduling device includes a processing unit and a sending unit. These units can execute corresponding functions in the method example of the second aspect. For details, refer to the detailed descriptions in the method example. Details are not described herein again.

In a possible implementation, a structure of the PUSCH scheduling device includes a transceiver, a memory, and a processor. The processor is configured to support the PUSCH scheduling device in performing corresponding functions in the method example of the second aspect. The memory is coupled to the processor and stores a program instruction and data that are necessary for the processor.

According to a seventh aspect, this application further provides a computer storage medium, the storage medium stores a software program, and when the software program is read and executed by one or more processors, the method provided in any design of any aspect can be implemented.

According to an eighth aspect, this application further provides a computer program product including an instruction, and when the instruction is run on a computer, the computer is enabled to perform the method in any one of the foregoing aspects.

DETAILED DESCRIPTION OF ILLUSTRATIVE EMBODIMENTS

The embodiments of this application provide a physical uplink shared channel PUSCH transmission method and an apparatus. The method and the apparatus are conceived based on a same inventive concept. The method and the apparatus have similar problem resolving principles. Therefore, for implementation of the apparatus and the method, refer to each other. Details of repeated parts are not described.

In the following, some terms in the embodiments of this application are described, to help a person skilled in the art have a better understanding.

(1) A resource unit (RU) is a resource allocation granularity of a PUSCH, and a quantity of subcarriers occupied by a resource unit in frequency domain is less than or equal to 12. The resource unit may be defined by using a quantity of subframes (or a quantity of slots) included in the resource unit in time domain and a quantity of subcarriers included in the resource unit in frequency domain, that is, i subcarriers×j subframes, where i and j are positive integers.

Figure 1:
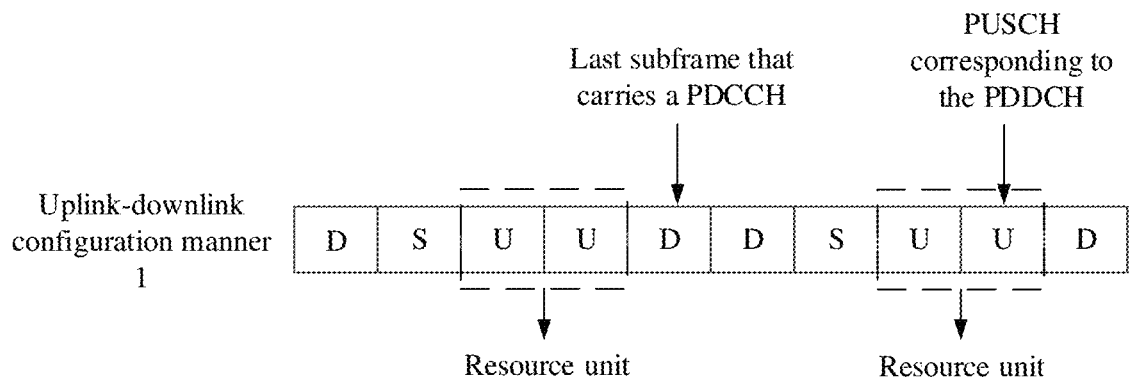
FIG. 1 is a correspondence between a subframe for transmitting a PUSCH and a subframe in a resource unit in the prior art.
Figure 2:
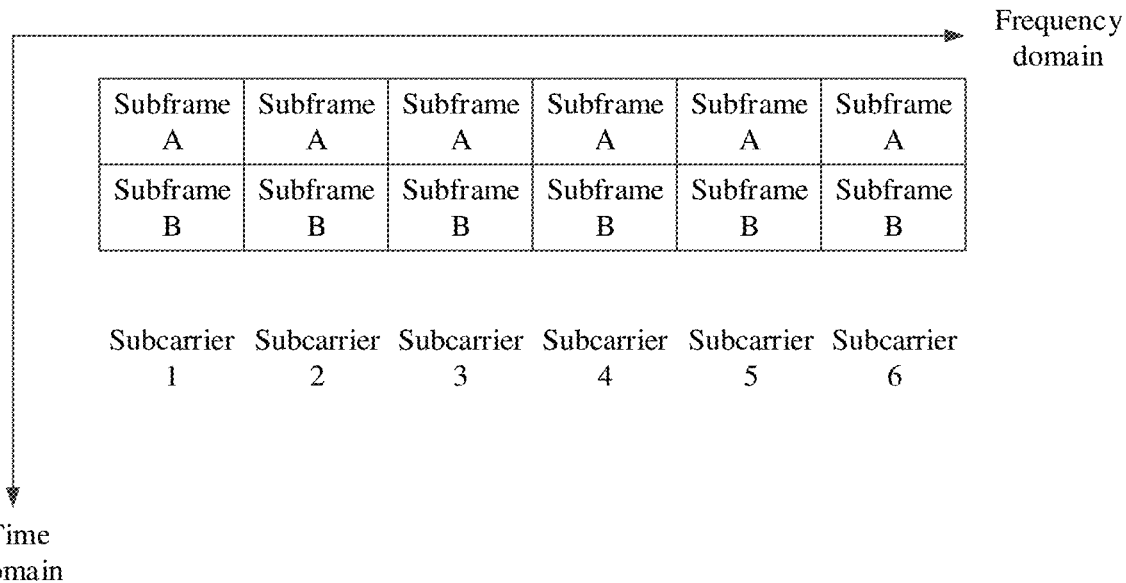
FIG. 2 is a schematic structural diagram of a resource unit according to an embodiment of this application.

In a TDD communications system, a resource unit may include but is not limited to the following types of resource units: 6 subcarriers×2 subframes, 4 subcarriers×3 subframes, 3 subcarriers×4 subframes, 12 subcarriers×1 subframes, 2 subcarriers×6 subframes, 2 subcarriers×4 subframes, and 2 subcarriers×8 subframes. For example, when a resource unit includes two subframes in time domain and six subcarriers in frequency domain, a structure of the resource unit is shown in FIG. 2.

(2) "A plurality of" means two or more than two.

(3) And/or describes an association relationship between associated objects, and indicates that three relationships may exist. For example, A and/or B may represent the following cases: Only A exists, both A and B exist, and only B exists. The character "/" generally indicates an "or" relationship between the associated objects.

In addition, it should be understood that in the description of this application, terms such as "first" and "second" are merely used for distinction description, and shall not be understood as an indication or implication of relative importance or an indication or implication of an order.

To describe the technical solutions in the embodiments of this application more clearly, the following describes in detail, with reference to the accompanying drawings, the PUSCH transmission method, the apparatus, and the device that are provided in the embodiments of this application.

Figure 3:
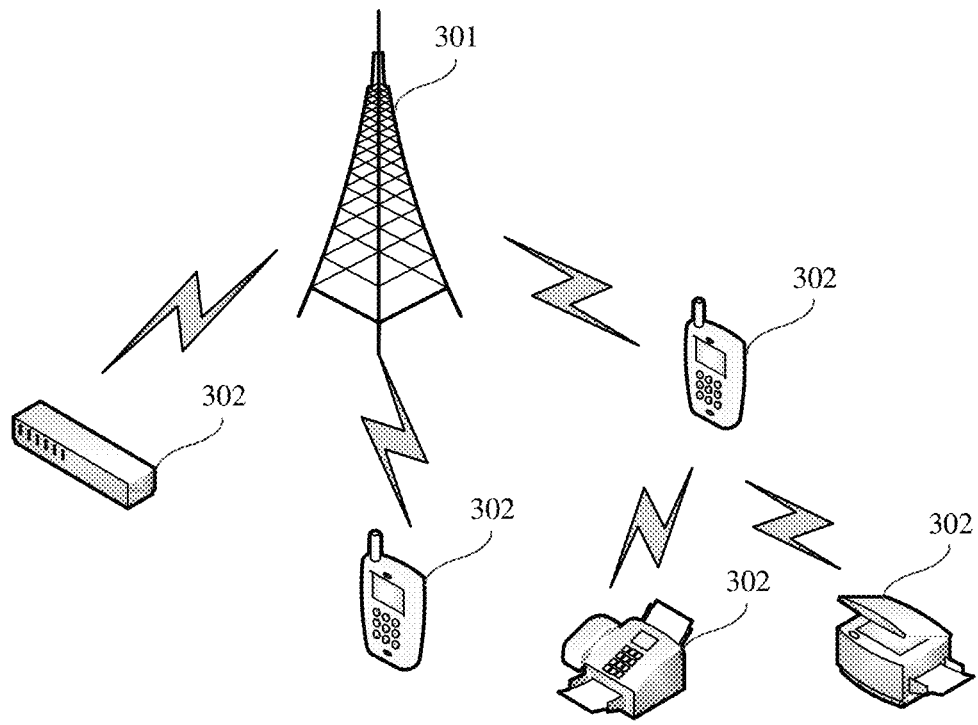
FIG. 3 is a schematic structural diagram of a communications system according to an embodiment of this application.

FIG. 3 shows a possible architecture of a communications system to which a PUSCH transmission method is applicable according to an embodiment of this application. The communications system 300 includes a network side device 301 and at least one terminal 302. The network side device 301 is configured to send an MPDCCH to the at least one terminal 302, and schedule, through the MPDCCH, the at least one terminal 302 to send a PUSCH corresponding to the MPDCCH, where a resource allocation granularity of the PUSCH corresponding to the MPDCCH is a target resource unit, and a quantity of subcarriers occupied by the target resource unit in frequency domain is less than or equal to 12. Alternatively, the network side device 301 is configured to send resource unit type indication information to the at least one terminal 302, so that the at least one terminal 302 determines a target resource unit type based on the resource unit type indication information, and sends a PUSCH based on the target resource unit type, where a resource unit corresponding to the target RU type includes one uplink subframe or a plurality of consecutive uplink subframes in time domain, and a quantity of subcarriers occupied by the resource unit corresponding to the target RU type in frequency domain is less than or equal to 12.

In addition, for any one of the at least one terminal 302, the terminal 302 may further schedule, through an MPDCCH, another terminal that can communicate with the terminal in the communications system 300 to send data to the terminal through a PUSCH corresponding to the MPDCCH. Alternatively, the terminal 302 may send resource unit type indication information to another terminal that can communicate with the terminal, so that the another terminal that can communicate with the terminal determines a target resource unit type based on the resource unit type indication information, and sends a PUSCH based on the target resource unit type.

The communications system 300 may be a cellular mobile communications system. For example, the wireless communications system may be a third generation mobile communications (3G) system, or may be a fourth generation mobile communications (4G) system, which is alternatively referred to as a long term evolution (LTE) system, or the wireless communications system may be a 5G system, which is alternatively referred to as a new radio (NR) system. The network side device 301 may be a base station (BS) in the 3G system or an evolved NodeB (eNB) used in the 4G system. Alternatively, the network side device 101 may be a gNB (gNB) that uses a centralized distributed architecture in the $_5$G system.

The terminal 302 may alternatively be referred to as user equipment (UE), a terminal, a mobile station (MS), a mobile terminal, or the like. The terminal 302 may communicate with one or more core networks through a radio access network (RAN). For example, the terminal 102 may be a mobile phone (or referred to as a "cellular" phone), a computer with a mobile terminal, or the like. For example, the terminal 102 may alternatively be a portable, pocket-sized, handheld, computer built-in, or in-vehicle mobile apparatus, and the mobile apparatus exchanges data with the radio access network. The terminal in the embodiments of this application may alternatively be a D2D (Device to Device) terminal or an M2M (Machine to Machine) terminal.

Figure 4:
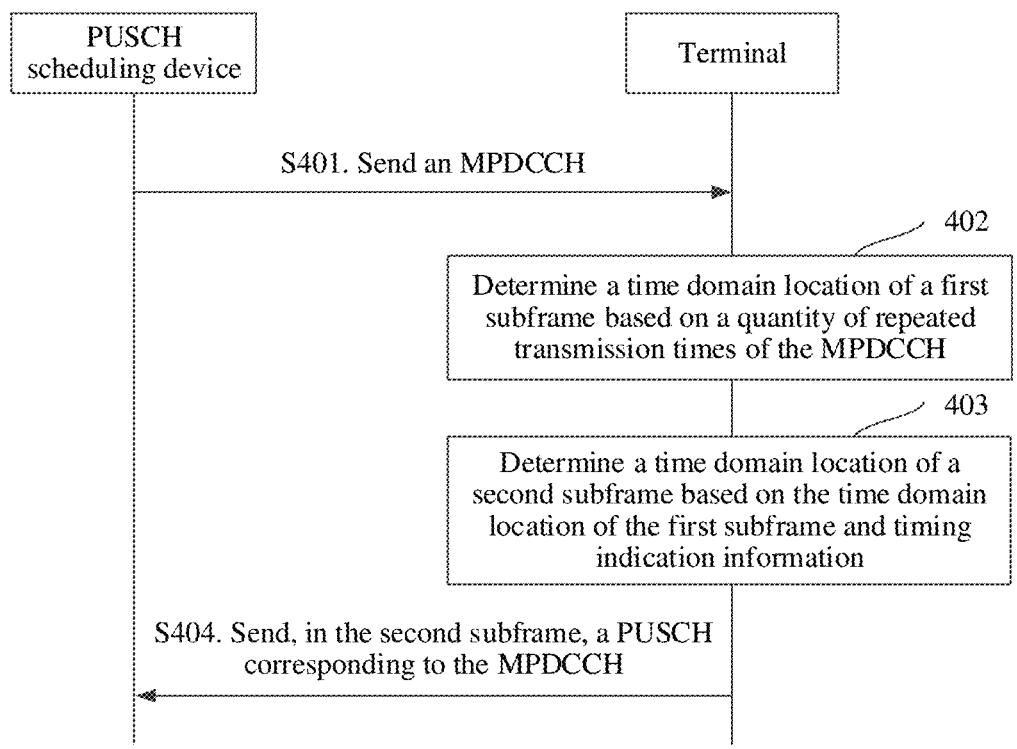
FIG. 4 is a schematic flowchart of a PUSCH transmission method according to an embodiment of this application.

A PUSCH transmission method provided in an embodiment of this application is applicable to the communications system 300 shown in FIG. 3. Referring to FIG. 4, a specific procedure of the method includes the following steps.

S401. A PUSCH scheduling device sends an MPDCCH. The MPDCCH includes a quantity of repeated sending times of the MPDCCH and timing indication information, and a first subframe is the last subframe that carries the MPDCCH. The timing indication information is used to indicate information required for determining a time domain location of a second subframe based on a time domain location of the first subframe.

Optionally, the PUSCH scheduling device is a network side device or a terminal.

In a specific implementation, the PUSCH scheduling device uses downlink control information (DCI) in the MPDCCH to carry the quantity of repeated sending times of the MPDCCH and the timing indication information.

Correspondingly, the terminal receives the MPDCCH, to obtain the quantity of repeated sending times of the MPDCCH and the timing indication information. It should be noted that, when the PUSCH scheduling device is a terminal, the terminal that receives the MPDCCH is another terminal that can communicate with the terminal.

In a specific implementation, the time domain location of the first subframe may be represented by a subframe number of the first subframe in a system frame. In an LTE TDD communications system, a system frame includes two 5-ms half-frames, each half-frame includes five i-ms subframes, and one subframe includes two slots. Subframes in the system frame are classified into three types: a downlink subframe, an uplink subframe, and a special subframe. The LTE TDD communications system supports seven uplink-downlink subframe configuration manners shown in Table 1. U represents an uplink subframe, D represents a downlink subframe, and S represents a special subframe. For example, if the last subframe that carries the MPDCCH is a subframe 5 in a system frame, the time domain location of the first subframe may be represented by the subframe 5.

TABLE 1

Uplink-downlink subframe configuration manner

| Uplink-downlink configuration | Downlink-to-uplink switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

$k_{PUSCH}$ corresponding to different uplink-downlink configurations in TDD mode

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

S402. The terminal determines the time domain location of the first subframe based on the quantity of repeated sending times of the MPDCCH.

Specifically, when the quantity of repeated sending times of the MPDCCH is greater than or equal to 1, the terminal determines the time domain location of the first subframe based on the $1^{st}$ received MPDCCH and the quantity of repeated sending times of the MPDCCH. When the quantity of repeated sending times of the MPDCCH is 0, the time domain location of the first subframe is a time domain location of a subframe in which the terminal receives the MPDCCH.

S403. The terminal determines the time domain location of the second subframe based on the time domain location of the first subframe and the timing indication information. The second subframe is a start subframe that carries a PUSCH corresponding to the MPDCCH, a resource allocation granularity of the PUSCH corresponding to the MPDCCH is a target resource unit, and a quantity of subcarriers occupied by the target resource unit in frequency domain is less than or equal to 12.

In an implementation, the terminal may determine the time domain location of the second subframe in the following three manners, but this is not limited.

Manner 1: When the timing indication information includes first location offset information, the terminal determines a time domain location of a third subframe based on the time domain location of the first subframe, and determines the time domain location of the second subframe based on the first location offset information and the time domain location of the third subframe.

The first location offset information indicates an offset of the time domain location of the second subframe relative to the time domain location of the third subframe, and the third subframe is a start subframe that is for sending the PUSCH and that is determined based on the first subframe when the resource allocation granularity of the PUSCH is a resource block RB.

In TDD mode, when the resource allocation granularity of the PUSCH is a resource block RB, the time domain location of the first subframe and an offset of the time domain location of the third subframe relative to the time domain location of the first subframe, that is, PUSCH scheduling time sequences, are shown in Table 2. If the first subframe is a subframe n, the third subframe is a subframe n+kPUSCH. For example, an uplink-downlink configuration manner agreed on between the terminal and the network side device is a configuration manner 0, and if the first subframe is a subframe 0, the third subframe is a subframe 4.

Specifically, when the timing indication information includes the first location offset information, the terminal determines the time domain location of the third subframe based on the time domain location of the first subframe and the PUSCH scheduling time sequences used when the resource allocation granularity of the PUSCH is a resource block RB, and determines the time domain location of the second subframe based on the time domain location of the third subframe and the first location offset information.

In a specific implementation, the first location offset information may indicate a first absolute location offset or a first relative location offset. The first absolute location offset is a total quantity of subframes from the third subframe to the second subframe, and the first relative position offset is a quantity of valid subframes from the third subframe to the second subframe. The valid subframes are bandwidth reduction low-complexity (bandwidth reduced low complexity, BL)/coverage enhancement (CE) subframes from the third subframe to the second subframe.

In a specific implementation, when the timing indication information is the first location offset information, before sending the MPDCCH, the PUSCH scheduling device further determines the time domain location of the first subframe based on the quantity of repeated sending times of the MPDCCH, determines the time domain location of the third subframe based on the time domain location of the first subframe, and determines the first location offset information based on the time domain location of the second subframe and the time domain location of the third subframe.

In a specific implementation, the PUSCH scheduling device determines the time domain location of the second subframe based on the time domain location of the first subframe and a quantity of subframes occupied by the target RU in time domain, so that the time domain location of the second subframe is the same as a time domain location of the $1^{st}$ subframe in the target resource unit.

Figure 5:
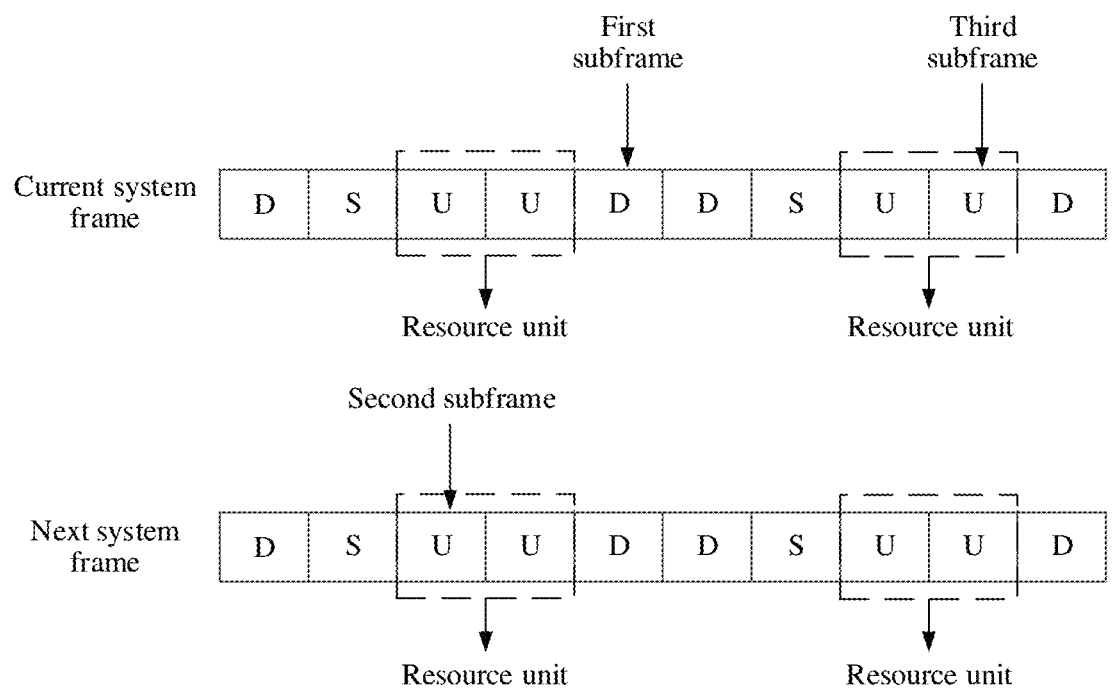
FIG. 5 is a correspondence between a subframe for transmitting a PUSCH and a subframe in a resource unit according to an embodiment of this application.

For example, when the target RU occupies two subframes in time domain, the uplink-downlink configuration manner agreed on between the terminal and the PUSCH scheduling device is 1, and the first subframe is a subframe 4, the PUSCH scheduling device looks up Table 2 based on the time domain location of the first subframe, to determine that the third subframe is a subframe 8. Because the target RU occupies two subframes in time domain, the second subframe is a subframe 2 in a next system frame, so that the time domain location of the second subframe is the same as the time domain location of the $1^{st}$ subframe in the target resource unit. In this case, the first absolute location offset is four subframes (the first relative location offset is one subframe). The terminal looks up Table 2 based on the time domain location of the first subframe, to determine that the third subframe is the subframe 8 (4+4), and the second subframe is a subframe 8+4=12, namely, the subframe 2 in the next system frame, as shown in FIG. 5. The terminal sends the PUSCH corresponding to the MPDCCH in the subframe 2 and a subframe 3 included in the target RU in the next system frame.

Manner 2: When the timing indication information is used to indicate second location offset indication information, the terminal determines the time domain location of the second subframe based on the time domain location of the first subframe and the second location offset information, and the second location offset information indicates an offset of the time domain location of the second subframe relative to the time domain location of the first subframe.

In a specific implementation, the second location offset information may indicate a second absolute location offset or a second relative location offset. The second absolute location offset is a total quantity of subframes from the first subframe to the second subframe, and the second relative position offset is a quantity of valid subframes from the first subframe to the second subframe. The valid subframes are BL/CE subframes.

In a specific implementation, if the timing indication information is the second location offset information, before sending the MPDCCH, the PUSCH scheduling device further determines the time domain location of the first subframe based on the quantity of repeated sending times the MPDCCH, and determines the second location offset information based on the time domain location of the first subframe and the time domain location of the second subframe.

For example, when the target RU occupies two subframes in time domain, the uplink-downlink configuration manner agreed on between the terminal and the PUSCH scheduling device is 1, and the first subframe is a subframe 4, the PUSCH scheduling device may learn, by looking up Table 2 based on the time domain location of the first subframe, that the PUSCH can be transmitted in a subframe 8 or a subframe after the subframe 8. Because the target RU occupies two subframes in time domain, it is determined that the second subframe is a subframe 2 in a next system frame, so that the time domain location of the second subframe is the same as a time domain location of the $1^{st}$ subframe in the target resource unit. In this case, the second absolute location offset is eight subframes (the first relative location offset is three subframes). The terminal determines, based on the time domain location of the first subframe and the second absolute location offset, that the second subframe is a subframe 8+4=12, namely, the subframe 2 in the next system frame, as shown in FIG. 5. The terminal sends the PUSCH corresponding to the MPDCCH in the subframe 2 and a subframe 3 included in the target RU in the next system frame.

Manner 3: When a first mapping relationship is configured in the terminal and the PUSCH scheduling device, the timing indication information is used to indicate the terminal to determine the time domain location of the second subframe based on the first mapping relationship, the first mapping relationship is a correspondence between the time domain location of the first subframe and a location offset when the resource allocation granularity of the PUSCH is an RU, and the location offset is an offset of the time domain location of the second subframe relative to the time domain location of the first subframe.

The terminal determines, based on the time domain location of the first subframe and the first mapping relationship, a location offset corresponding to the time domain location of the first subframe, and determines the time domain location of the second subframe based on the location offset corresponding to the time domain location of the first subframe and the time domain location of the first subframe.

In a specific implementation, the first mapping relationship is preconfigured in the terminal and the PUSCH scheduling device. For a time domain location of any first subframe in the first mapping relationship, a time domain location obtained after the time domain location of the first subframe is offset by the location offset corresponding to the time domain location of the first subframe is the same as a time domain location of the $1^{st}$ subframe in the target RU.

For example, when the target RU occupies two subframes in time domain and occupies six subcarriers in frequency domain, the first mapping relationship is shown in Table 3. A subframe number of the first subcarrier in a system frame is used as the time domain location of the first subframe, and a second location offset is a second absolute location offset.

TABLE 3

| First mapping relationship | | | | | | | | | | |
|---|---|---|---|---|---|---|---|---|---|---|
| TDD uplink-downlink | Subframe number | | | | | | | | | |
| configuration | 0 | 1 | 2 | 3 | 4 | 5 | 6 | 7 | 8 | 9 |
| 0 | | 7 | 6 | | | 7 | 6 | | | |
| 1 | | | 6 | | 8 | | 6 | | | 8 |
| 2 | | | | | | | | | | |
| 3 | 12 | | | | | | | | 4 | 4 |
| 4 | | | | | | | | | 4 | |
| 5 | | | | | | | | | | |
| 6 | | 7 | 11 | | | 7 | 7 | | | 8 |

Figure 6:
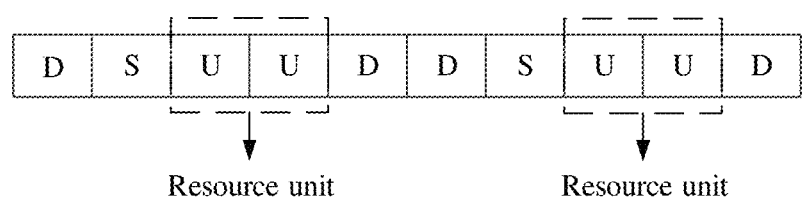
FIG. 6 shows a mapping relationship between a resource unit and a system frame according to an embodiment of this application.

To ensure accuracy of a channel estimation result, in a specific implementation, the target resource unit includes one uplink subframe or a plurality of consecutive uplink subframes in time domain. In other words, subframes carrying the PUSCH corresponding to the MPDCCH are consecutive in time domain. For example, when a structure of the target resource unit is shown in FIG. 2, for the uplink-downlink configuration manner 1, the target resource unit is mapped to a system frame, as shown in FIG. 6.

In an implementation, a second mapping relationship is configured in the terminal and the PUSCH scheduling device, and the second mapping relationship is a correspondence between an uplink-downlink configuration manner and a resource unit. When an uplink-downlink configuration manner agreed on between the terminal and the PUSCH scheduling device corresponds to one resource unit in the second mapping relationship, the target resource unit is the resource unit corresponding to the uplink-downlink configuration manner agreed on between the terminal and the PUSCH scheduling device in the second mapping relationship. For example, the second mapping relationship is shown in Table 4.

TABLE 4

Second mapping relationship

| TDD uplink-downlink configuration manner | Resource unit | | Subframe number | | | | | | | | | |
|---|---|---|---|---|---|---|---|---|---|---|---|---|
| | Quantity of subframes | Quantity of subcarriers | 0 | 1 | 2 | 3 | 4 | 5 | 6 | 7 | 8 | 9 |
| 0 | 3 | 4  | D | S | U | U | U | D | S | U | U | U |
| 1 | 2 | 6  | D | S | U | U | D | D | S | U | U | D |
| 2 | 1 | 12 | D | S | U | D | D | D | S | U | D | D |
| 3 | 3 | 4  | D | S | U | U | U | D | D | D | D | D |
| 4 | 2 | 6  | D | S | U | U | D | D | D | D | D | D |
| 5 | 1 | 12 | D | S | U | D | D | D | D | D | D | D |
| 6 | 1 | 12 | D | S | U | U | U | D | S | U | U | D |

When an uplink-downlink configuration manner agreed on between the terminal and the PUSCH scheduling device corresponds to a plurality of resource units in the second mapping relationship, the target resource unit is a resource unit selected by the PUSCH scheduling device from the plurality of resource units and notified to the terminal. For example, the second mapping relationship is shown in Table 5.

TABLE 5

Second mapping relationship

| TDD uplink-downlink configuration manner | Resource unit 1 | | Resource unit 2 | | Subframe number | | | | | | | | | |
|---|---|---|---|---|---|---|---|---|---|---|---|---|---|---|
| | Quantity of subframes | Quantity of subcarriers | Quantity of subframes | Quantity of subcarriers | 0 | 1 | 2 | 3 | 4 | 5 | 6 | 7 | 8 | 9 |
| 0 | 3 | 4  | 1 | 12 | D | S | U | U | U | D | S | U | U | U |
| 1 | 2 | 6  | — | —  | D | S | U | U | D | D | S | U | U | D |
| 2 | 1 | 12 | — | —  | D | S | U | D | D | D | S | U | D | D |
| 3 | 3 | 4  | 1 | 12 | D | S | U | U | U | D | D | D | D | D |
| 4 | 2 | 6  | — | —  | D | S | U | U | D | D | D | D | D | D |
| 5 | 1 | 12 | — | —  | D | S | U | D | D | D | D | D | D | D |
| 6 | 1 | 12 | — | —  | D | S | U | U | U | D | S | U | U | D |

In a specific implementation, when the uplink-downlink configuration manner agreed on between the terminal and the PUSCH scheduling device corresponds to the plurality of resource units in the second mapping relationship, if the PUSCH scheduling device is a network side device, the network side device selects one resource unit from the plurality of resource units as the target resource unit, and may notify the target resource unit to the terminal by using the MPDCCH or higher layer signaling.

In a specific implementation, for the seven uplink-downlink configuration manners shown in Table 1, the second mapping relationship meets the following table:

| TDD uplink-downlink configuration manner | Resource unit | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | First resource unit and/or second resource unit | D | S | U | U | U | D | S | U | U | U |
| 1 | First resource unit and/or third resource unit | D | S | U | U | D | D | S | U | U | D |
| 2 | First resource unit | D | S | U | D | D | D | S | U | D | D |
| 3 | First resource unit and/or second resource unit | D | S | U | U | U | D | D | D | D | D |

-continued

| TDD uplink-downlink configuration | | Subframe number | | | | | | | | | |
|---|---|---|---|---|---|---|---|---|---|---|---|
| manner | Resource unit | 0 | 1 | 2 | 3 | 4 | 5 | 6 | 7 | 8 | 9 |
| 4 | First resource unit and/or second resource unit | D | S | U | U | D | D | D | D | D | D |
| 5 | First resource unit | D | S | U | D | D | D | D | D | D | D |
| 6 | First resource unit | D | S | U | U | U | D | S | U | U | D |

The first resource unit occupies one subframe in time domain, the second resource unit occupies three subframes in time domain, and the third resource unit occupies two subframes in time domain.

For any uplink-downlink configuration manner in the second mapping relationship, when a resource unit corresponding to the uplink-downlink configuration manner is mapped to a system frame corresponding to the uplink-downlink configuration manner, all uplink subframes in the system frame corresponding to the uplink-downlink configuration manner are included in one or more resource units corresponding to the uplink-downlink configuration manner, and subframes included in a resource unit corresponding to each uplink-downlink configuration manner are consecutive, for example, the mapping relationship between a resource unit and a system frame shown in FIG. 2. In this way, the terminal can effectively use an uplink subframe in the uplink-downlink configuration manner agreed on between the terminal and the PUSCH scheduling device, and transmit the PUSCH at a resource allocation granularity of resource unit.

In an implementation, to reduce impact on an information system architecture caused by transmitting the PUSCH in TDD mode at the resource allocation granularity of resource unit, a quantity M of subframes occupied by the target resource unit in time domain and a quantity N of subcarriers occupied by the target resource unit in frequency domain meet $|M \times N - 12| \leq a$ M and N are positive integers, a is an integer greater than or equal to 0, so that M×N is close to 12 as much as possible. In addition, compared with the prior art in which the PUSCH is transmitted at a resource allocation granularity of RB (occupying 12 subcarriers in frequency domain), in this application, when the terminal transmits the PUSCH by using a resource unit by which a quantity M of subframes occupied in time domain and a quantity N of subcarriers occupied in frequency domain meet $|M \times N - 12| \leq a$, the PUSCH occupies a relatively small quantity of subcarriers. Therefore, transmit power of the terminal on each subcarrier can be increased.

S404. The terminal sends, in the second subframe based on the time domain location of the second subframe, the PUSCH corresponding to the MPDCCH.

Correspondingly, when the timing indication information includes the first location offset information or the second location offset information, the PUSCH scheduling device determines, based on the time domain location of the first subframe and the quantity of subframes occupied by the target resource unit in time domain, determines the first location offset information, determines the time domain location of the second subframe, and receives, in the second subframe, the PUSCH corresponding to the MPDCCH.

When the timing indication information is used to indicate the terminal to determine the time domain location of the second subframe based on the first mapping relationship, the PUSCH scheduling device determines, based on the time domain location of the first subframe and the first mapping relationship, the location offset corresponding to the time domain location of the first subframe, determines the time domain location of the second subframe based on the location offset corresponding to the time domain location of the first subframe and the time domain location of the first subframe, and receives, in the second subframe, the PUSCH corresponding to the MPDCCH.

In a specific embodiment, when the PUSCH scheduling device is a network side device, the network side device sends the MPDCCH including the quantity of repeated sending times of the MPDCCH and higher layer signaling including the timing indication information. The terminal receives the higher layer signaling, and obtains the timing indication information from the higher layer signaling. The terminal determines the time domain location of the first subframe based on the quantity of repeated sending times of the MPDCCH, determines the time domain location of the second subframe based on the timing indication information and the time domain location of the first subframe, and sends, in the second subframe, the PUSCH corresponding to the MPDCCH. For a specific method in which the terminal determines the time domain location of the second subframe based on the timing indication information and the time domain location of the first subframe, refer to related descriptions in step S303. Details are not described herein again.

It should be noted that when the PUSCH scheduling device is a network side device, a sequence of sending, by the network side device, the MPDCCH including the quantity of repeated sending times of the MPDCCH and the higher layer signaling including the timing indication information is not limited in this embodiment of this application. The network side device may first send the MPDCCH including the quantity of repeated sending times of the MPDCCH, and then send the higher layer signaling including the timing indication information, or may first send the higher layer signaling including the timing indication information, and then send the higher layer signaling including the timing indication information, or may simultaneously send the MPDCCH including the quantity of repeated sending times of the MPDCCH and the higher layer signaling including the timing indication information.

Optionally, the terminal may also send, to another terminal that can communicate with the terminal, an MPDCCH including a quantity of repeated sending times of the MPDCCH and the timing indication information, so that the another terminal that can communicate with the terminal sends, to the terminal by using steps S302 to S304, a PUSCH corresponding to the MPDCCH.

According to the foregoing method, the terminal receives the MPDCCH including the quantity of repeated sending times of the MPDCCH and the timing indication information, determines the time domain location of the first subframe based on the quantity of repeated sending times of the MPDCCH, and determines the time domain location of the second subframe based on the time domain location of the first subframe and the timing indication information, so that the time domain location of the start subframe that carries the PUSCH corresponding to the MPDCCH is the same as the time domain location of the $1^{st}$ subframe occupied by the target RU in time domain. Therefore, the terminal can fully use subframes occupied by the target RU to transmit the PUSCH corresponding to the MPDCCH, to ensure transmission quality of data carried on the PUSCH corresponding to the MPDCCH. The first subframe is the last subframe that carries the MPDCCH, and the second subframe is the start subframe that carries the PUSCH corresponding to the MPDCCH. The resource allocation granularity of the PUSCH corresponding to the MPDCCH is the target RU, and the quantity of subcarriers occupied by the target RU in frequency domain is less than or equal to 12. In addition, the terminal determines the time domain location of the second subframe based on the time domain location of the first subframe and the timing indication information, so that the time domain location of the start subframe that carries the PUSCH corresponding to the MPDCCH is the same as the time domain location of the $1^{st}$ subframe occupied by the target RU in time domain. Time domain locations of subframes that carry the MPDCCH do not need to be limited, so that the MPDCCH sent by the PUSCH scheduling device has relatively high flexibility.

Figure 7:
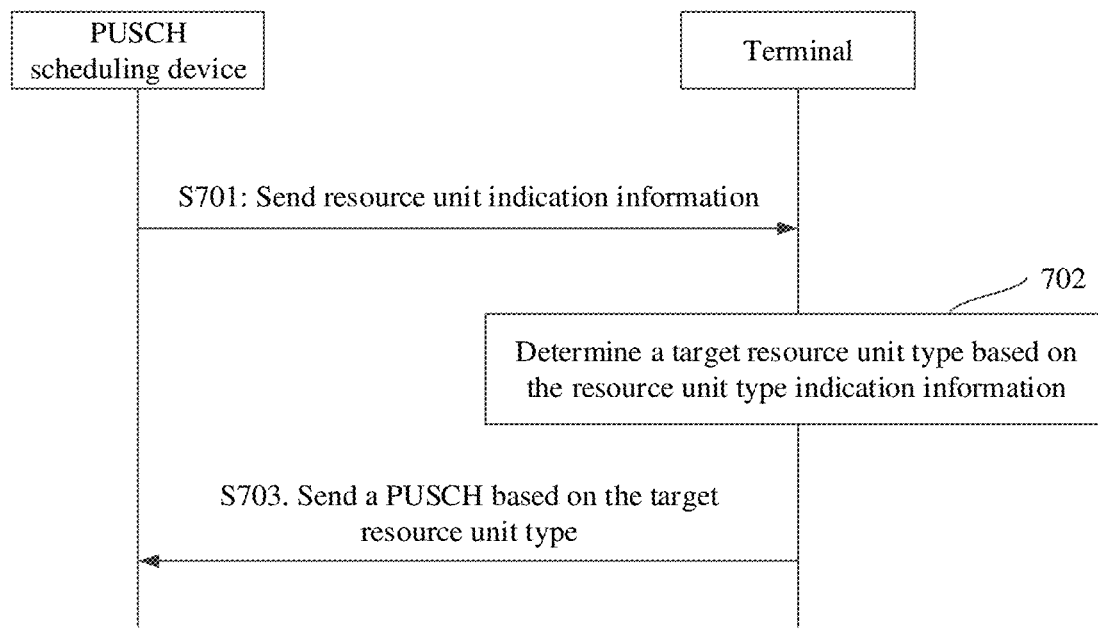
FIG. 7 is a schematic flowchart of another PUSCH transmission method according to an embodiment of this application.

Referring to FIG. 7, another PUSCH transmission method provided in an embodiment of this application is applicable to the communications system 300 shown in FIG. 3. The method mainly includes the following steps.

S701. A PUSCH scheduling device sends resource unit RU type indication information to a terminal.

The PUSCH scheduling device is a network side device or a terminal. When the PUSCH scheduling device is a network side device, the PUSCH scheduling device may send the RU type indication information through an MPDCCH, or send the RU type indication information through higher layer signaling. When the PUSCH scheduling device is a terminal, the PUSCH scheduling device may send the RU type indication information through an MPDCCH.

In a specific implementation, different resource unit types may be represented by a quantity of subframes (or a quantity of slots occupied by a resource unit in time domain) occupied by a resource unit in time domain and a quantity of subcarriers occupied by the resource unit in frequency domain.

Correspondingly, the terminal receives the resource unit RU type indication information. It should be noted that, when the PUSCH scheduling device is a terminal, the terminal that receives the RU type indication information is another terminal that can communicate with the terminal.

S702. The terminal determines, based on the RU type indication information, a type of a target resource unit RU that carries a physical uplink shared channel PUSCH. The resource unit corresponding to the target RU type includes one uplink subframe or a plurality of consecutive uplink subframes in time domain, and a quantity of subcarriers occupied by the resource unit corresponding to the target RU type in frequency domain is less than or equal to 12.

In a specific implementation, when a mapping relationship between an uplink-downlink subframe configuration manner and a resource unit type is configured in the terminal, the terminal may determine the target RU type in the following two manners, but this is not limited.

Manner A: If uplink-downlink configuration manners one-to-one correspond to resource unit types in the mapping relationship, and the resource unit type indication information includes a target uplink-downlink subframe configuration manner, the terminal determines a resource unit type corresponding to the target uplink-downlink subframe configuration manner in the mapping relationship as the target RU type.

Manner B: If any uplink-downlink configuration manner corresponds to a plurality of resource unit types in the mapping relationship, and the resource unit type indication information includes a target uplink-downlink subframe configuration manner and target resource unit type indication information, the terminal determines, based on the target uplink-downlink subframe configuration manner and the mapping relationship, resource unit types corresponding to the target uplink-downlink subframe configuration manner, and determines, as the target RU type, a resource unit type that is in the resource unit types corresponding to the target uplink-downlink subframe configuration manner and that is indicated by the target resource unit type indication information.

The target resource unit type indication information may be an identifier of the target resource unit type. For example, there are k resource unit types in the mapping relationship, numbers of the k resource unit types are respectively 1, 2, . . . , and k, and the target resource unit type indication information may be a number corresponding to the target resource unit type. For another example, in the mapping relationship, the target uplink-downlink subframe configuration manner corresponds to two resource unit types. "o" may be used to represent the first resource unit type corresponding to the target uplink-downlink subframe configuration manner, and "1" may be used to represent the second resource unit type corresponding to the target uplink-downlink subframe configuration manner. In this case, the target resource unit type indication information is "o" or "1".

In a specific implementation, the mapping relationship between an uplink-downlink subframe configuration manner and a resource unit type meets the following table:

| TDD uplink-downlink configuration manner | Resource unit type | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | First RU type and/or second RU type | D | S | U | U | U | D | S | U | U | U |
| 1 | First RU type and/or third RU type | D | S | U | U | D | D | S | U | U | D |
| 2 | First RU type | D | S | U | D | D | D | S | U | D | D |
| 3 | First RU type and/or second RU type | D | S | U | U | U | D | D | D | D | D |

| TDD uplink-downlink configuration manner | Resource unit type | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | First RU type and/or second RU type | D | S | U | U | D | D | D | D | D | D |
| 5 | First RU type | D | S | U | D | D | D | D | D | D | D |
| 6 | First RU type | D | S | U | U | U | D | S | U | U | D |

An RU corresponding to the first RU type occupies one subframe in time domain, an RU corresponding to the second RU type occupies three subframes in time domain, and an RU corresponding to the third RU type occupies two subframes in time domain.

For a resource unit type corresponding to any uplink-downlink configuration manner in the mapping relationship, when a resource unit corresponding to the resource unit type is mapped to a system frame corresponding to the uplink-downlink configuration manner, all uplink subframes in the system frame corresponding to the uplink-downlink configuration manner are included in one or more resource units corresponding to the uplink-downlink configuration manner, and subframes included in a resource unit corresponding to each uplink-downlink configuration manner are consecutive, for example, the mapping relationship between a resource unit and a system frame shown in FIG. 2. In this way, the terminal can effectively use an uplink subframe in the uplink-downlink configuration manner agreed on between the terminal and the PUSCH scheduling device, and transmit the PUSCH at a resource allocation granularity of resource unit.

In an implementation, to reduce impact on an information system architecture caused by transmitting the PUSCH in TDD mode at the resource allocation granularity of resource unit, a quantity M of subframes occupied by the RU corresponding to the target RU type in time domain and a quantity N of subcarriers occupied the RU corresponding to the target RU type in frequency domain meet |M×N−12|≤a. M and N are positive integers, a is an integer greater than or equal to 0, so that M×N is close to 12 as much as possible. In addition, compared with the prior art in which the PUSCH is transmitted at a resource allocation granularity of RB (occupying 12 subcarriers in frequency domain), in this application, when the terminal transmits the PUSCH by using a resource unit by which a quantity M of subframes occupied in time domain and a quantity N of subcarriers occupied in frequency domain meet |M×N−12|≤a, the PUSCH occupies a relatively small quantity of subcarriers. Therefore, transmit power of the terminal on each subcarrier can be increased.

S703. The terminal sends the PUSCH based on the target RU type.

In a specific implementation, a start subframe of the resource unit corresponding to the target RU type is the first uplink subframe in a system frame or the first uplink subframe in a slot, so that the resource unit corresponding to the target RU type can be mapped to consecutive subframes in time domain. Therefore, the terminal can transmit the PUSCH in consecutive subframes in time domain, thereby ensuring channel estimation accuracy.

According to the foregoing method, the terminal receives the resource unit RU type indication information, determines the target RU type based on the resource unit RU type indication information, and sends the PUSCH based on the target RU type. The RU corresponding to the target RU type includes one uplink subframe or a plurality of consecutive uplink subframes in time domain, and the quantity of subcarriers occupied by the resource unit corresponding to the target RU type in frequency domain is less than or equal to 12. In this way, the terminal sends the PUSCH by mapping the RU corresponding to the target RU type to one uplink subframe in a system frame or a plurality of consecutive uplink subframes in time domain, so that a problem of an inaccurate channel estimation result caused by non-consecutive subframes included in a resource unit can be resolved.

Figure 8:
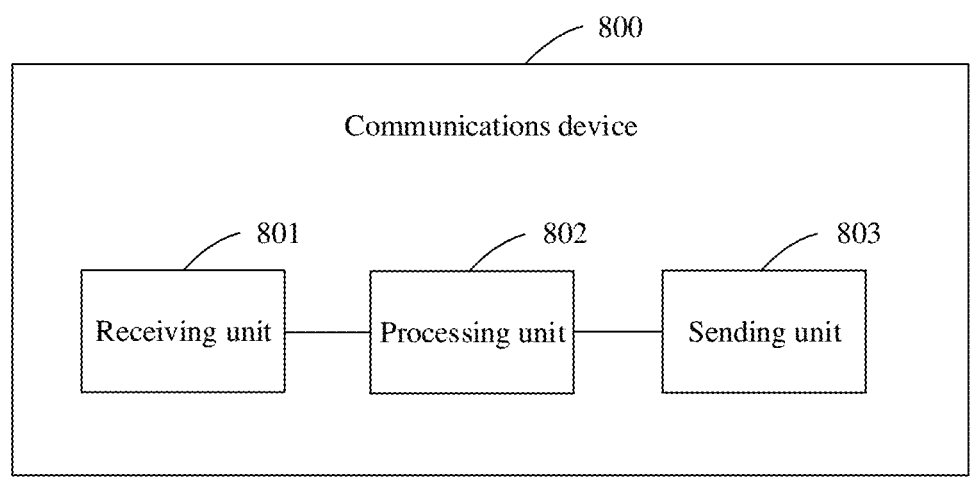
FIG. 8 is a schematic structural diagram of a communications device according to an embodiment of this application.

Based on the foregoing embodiments, an embodiment of this application provides a communications device. The communications device is configured to implement the PUSCH transmission method shown in FIG. 4. Referring to FIG. 8, the communications device 800 includes a receiving unit 801, a processing unit 802, and a sending unit 803.

The receiving unit 801 is configured to receive a machine physical downlink control channel MPDCCH, where the MPDCCH includes a quantity of repeated sending times of the MPDCCH and timing indication information.

The processing unit 802 is configured to: determine a time domain location of a first subframe based on the quantity of repeated sending times of the MPDCCH, and determine a time domain location of a second subframe based on the timing indication information and the time domain location of the first subframe, where the first subframe is the last subframe that carries the MPDCCH, the second subframe is a start subframe that carries a physical uplink shared channel PUSCH corresponding to the MPDCCH, a resource allocation granularity of the PUSCH corresponding to the MPDCCH is a target resource unit, and a quantity of subcarriers occupied by the target resource unit in frequency domain is less than or equal to 12.

The sending unit 803 is configured to send, in the second subframe based on the time domain location of the second subframe, the PUSCH corresponding to the MPDCCH.

Optionally, the timing indication information includes first location offset information, the first location offset information indicates an offset of the time domain location of the second subframe relative to a time domain location of a third subframe, and the third subframe is a start subframe that is for sending the PUSCH and that is determined based on the time domain location of the first subframe when the resource allocation granularity of the PUSCH is a resource block RB.

When determining the time domain location of the second subframe based on the timing indication information and the time domain location of the first subframe, the processing unit 802 is specifically configured to: determine the time domain location of the third subframe based on the time domain location of the first subframe, and determine the time domain location of the second subframe based on the first location offset information and the time domain location of the third subframe.

Optionally, the timing indication information includes second location offset information, and the second location offset information indicates an offset of the time domain location of the second subframe relative to the time domain location of the first subframe.

When determining the time domain location of the second subframe based on the timing indication information and the time domain location of the first subframe, the processing unit 802 is specifically configured to determine the time domain location of the second subframe based on the time domain location of the first subframe and the second location offset information.

Optionally, the timing indication information is used to indicate the terminal to determine the time domain location of the second subframe based on a first mapping relationship, the first mapping relationship is a correspondence between the time domain location of the first subframe and a location offset when the resource allocation granularity of the PUSCH is an RU, and the location offset is an offset of the time domain location of the second subframe relative to the time domain location of the first subframe.

When determining the time domain location of the second subframe based on the time domain location of the first subframe and the timing indication information, the processing unit 802 is specifically configured to determine the time domain location of the second subframe based on the time domain location of the first subframe and the first mapping relationship.

Optionally, the target resource unit includes one uplink subframe or a plurality of consecutive uplink subframes in time domain.

Optionally, the sending unit 803 is further configured to send the MPDCCH including the quantity of repeated sending times of the MPDCCH and the timing indication information.

Optionally, a second mapping relationship is configured in the communications device and a PUSCH scheduling device, the second mapping relationship is a mapping relationship between an uplink-downlink configuration manner and a resource unit, and the PUSCH scheduling device is a device that sends the MPDCCH.

When an uplink-downlink configuration manner agreed on between the communications device and the PUSCH scheduling device corresponds to one resource unit in the second mapping relationship, the target resource unit is the resource unit corresponding to the uplink-downlink configuration manner agreed on between the communications device and the PUSCH scheduling device in the second mapping relationship; or when an uplink-downlink configuration manner agreed on between the communications device and the PUSCH scheduling device corresponds to a plurality of resource units in the second mapping relationship, the target resource unit is a resource unit selected by the PUSCH scheduling device from the plurality of resource units and notified to the communications device.

Optionally, the second mapping relationship meets the following table:

| Time division duplex TDD uplink-downlink configuration manner | Resource unit |
| --- | --- |
| 0 | First resource unit and/or second resource unit |
| 1 | First resource unit and/or third resource unit |
| 2 | First resource unit |
| 3 | First resource unit and/or second resource unit |
| 4 | First resource unit and/or second resource unit |
| 5 | First resource unit |
| 6 | First resource unit |

The first resource unit occupies one subframe in time domain, the second resource unit occupies three subframes in time domain, and the third resource unit occupies two subframes in time domain.

Optionally, a quantity M of subframes occupied by the target resource unit in time domain and a quantity N of subcarriers occupied by the target resource unit in frequency domain meet $|M \times N - 12| \leq a$, where M and N are positive integers, and a is an integer greater than or equal to 0.

It should be noted that, in the embodiments of this application, division into the units is used as an example, and is merely logical function division. In an actual implementation, another division manner may be used. Function modules in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes a medium that can store program code, such as a USB flash drive, a removable hard disk, a read-only memory (ROM), a random access memory (RAM), a magnetic disk, or an optical disc.

Figure 9:
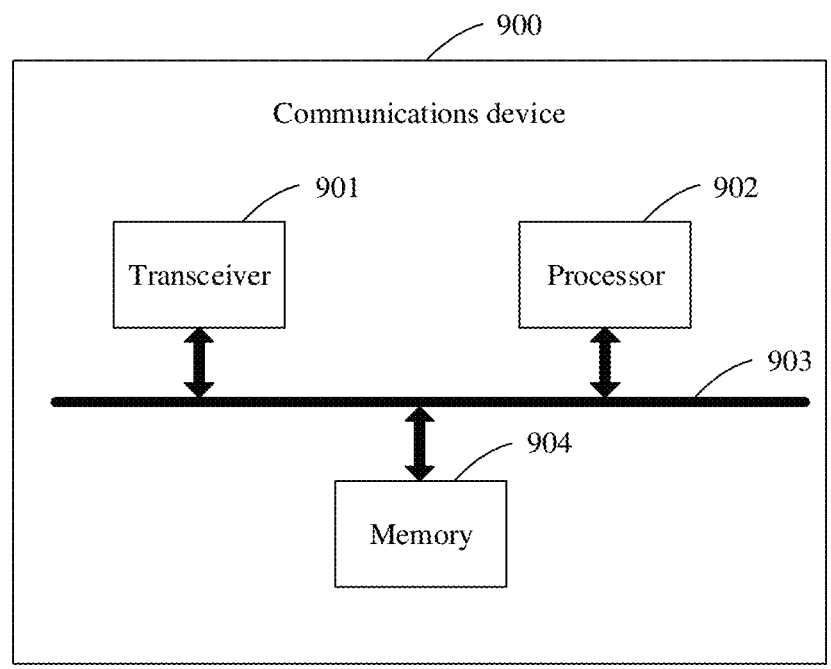
FIG. 9 is a schematic structural diagram of a communications device according to an embodiment of this application.

Based on the foregoing embodiments, an embodiment of this application provides a communications device. The communications device is configured to implement the PUSCH transmission method shown in FIG. 4 and has the functions of the communications device 800 shown in FIG. 8. Referring to FIG. 9, the communications device 900 includes a transceiver 901 and a processor 902. The transceiver 901 and the processor 902 are connected to each other.

The transceiver 901 is configured to receive a machine physical downlink control channel MPDCCH, where the MPDCCH includes a quantity of repeated sending times of the MPDCCH and timing indication information.

The processor 902 is configured to: determine a time domain location of a first subframe based on the quantity of repeated sending times of the MPDCCH, determine a time domain location of a second subframe based on the timing indication information and the time domain location of the first subframe, and control the transceiver 901 to send, in the second subframe based on the time domain location of the second subframe, a PUSCH corresponding to the MPDCCH, where the first subframe is the last subframe that carries the MPDCCH, the second subframe is a start subframe that carries the physical uplink shared channel PUSCH corresponding to the MPDCCH, a resource allocation granularity of the PUSCH corresponding to the MPDCCH is a target resource unit, and a quantity of subcarriers occupied by the target resource unit in frequency domain is less than or equal to 12.

The transceiver 901 is further configured to send, in the second subframe, the PUSCH corresponding to the MPDCCH.

Optionally, the processor 902 may be a central processing unit (CPU), a network processor (NP), or a combination of the CPU and the NP. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the processor 902 and the transceiver 901 may be connected to each other through the bus 903. The bus 903 may be a peripheral component interconnect (PCI) bus, an extended industry standard architecture (EISA) bus, and or the like. The bus 903 may be classified into an address bus, a data bus, a control bus, and the like. For ease of representation, only one thick line is used to represent the bus in FIG. 9, but this does not mean that there is only one bus or only one type of bus.

Optionally, the timing indication information includes first location offset information, the first location offset information indicates an offset of the time domain location of the second subframe relative to a time domain location of a third subframe, and the third subframe is a start subframe that is for sending the PUSCH and that is determined based on the time domain location of the first subframe when the resource allocation granularity of the PUSCH is a resource block RB.

When determining the time domain location of the second subframe based on the timing indication information and the time domain location of the first subframe, the processor 902 is specifically configured to: determine the time domain location of the third subframe based on the time domain location of the first subframe, and determine the time domain location of the second subframe based on the first location offset information and the time domain location of the third subframe.

Optionally, the timing indication information includes second location offset information, and the second location offset information indicates an offset of the time domain location of the second subframe relative to the time domain location of the first subframe.

When determining the time domain location of the second subframe based on the timing indication information and the time domain location of the first subframe, the processor 902 is specifically configured to determine the time domain location of the second subframe based on the time domain location of the first subframe and the second location offset information.

Optionally, the communications device further includes a memory 904, configured to store a first mapping relationship, where the first mapping relationship is a correspondence between the time domain location of the first subframe and a location offset when the resource allocation granularity of the PUSCH is an RU, and the location offset is an offset of the time domain location of the second subframe relative to the time domain location of the first subframe.

If the timing indication information is used to indicate the communications device to determine the time domain location of the second subframe based on the first mapping relationship, when determining the time domain location of the second subframe based on the time domain location of the first subframe and the timing indication information, the processor 902 is specifically configured to determine the time domain location of the second subframe based on the time domain location of the first subframe and the first mapping relationship.

Optionally, the target resource unit includes one uplink subframe or a plurality of consecutive uplink subframes in time domain.

Optionally, the memory 904 is further configured to store a second mapping relationship, where the second mapping relationship is a mapping relationship between an uplink-downlink configuration manner and a resource unit.

When an uplink-downlink configuration manner agreed on between the communications device and a PUSCH scheduling device corresponds to one resource unit in the second mapping relationship, the target resource unit is the resource unit corresponding to the uplink-downlink configuration manner agreed on between the communications device and the PUSCH scheduling device in the second mapping relationship, and the PUSCH scheduling device is a device that sends the MPDCCH; or when an uplink-downlink configuration manner agreed on between the communications device and the PUSCH scheduling device corresponds to a plurality of resource units in the second mapping relationship, the target resource unit is a resource unit selected by the PUSCH scheduling device from the plurality of resource units and notified to the communications device.

Optionally, the memory 904 may include a volatile memory, for example, a random-access memory (RAM). The memory 904 may alternatively include a non-volatile memory, for example, a flash memory, a hard disk drive (HDD), or a solid-state drive (SSD). The memory 904 may alternatively include a combination of the foregoing memories.

Optionally, the memory 904 may include a RAM, or may include a non-volatile memory, for example, at least one magnetic disk storage.

Optionally, the second mapping relationship meets the following table:

| Time division duplex TDD uplink-downlink configuration manner | Resource unit |
|---|---|
| 0 | First resource unit and/or second resource unit |
| 1 | First resource unit and/or third resource unit |
| 2 | First resource unit |
| 3 | First resource unit and/or second resource unit |
| 4 | First resource unit and/or second resource unit |
| 5 | First resource unit |
| 6 | First resource unit |

The first resource unit occupies one subframe in time domain, the second resource unit occupies three subframes in time domain, and the third resource unit occupies two subframes in time domain.

Optionally, a quantity M of subframes occupied by the target resource unit in time domain and a quantity N of subcarriers occupied by the target resource unit in frequency domain meet |M×N−12|≤a, where M and N are positive integers, and a is an integer greater than or equal to 0.

The embodiments of this application provide the terminal. The terminal may determine, based on the received MPDCCH including the quantity of repeated sending times of the MPDCCH and the timing indication information, the time domain location of the start subframe that carries the PUSCH corresponding to the MPDCCH, so that the time domain location of the start subframe that carries the PUSCH corresponding to the MPDCCH is the same as a time domain location of the $1^{st}$ subframe occupied by the target RU in time domain, and the terminal can fully use subframes occupied by the target RU to transmit the PUSCH corresponding to the MPDCCH, to ensure transmission quality of data carried on the PUSCH corresponding to the MPDCCH.

Figure 10:
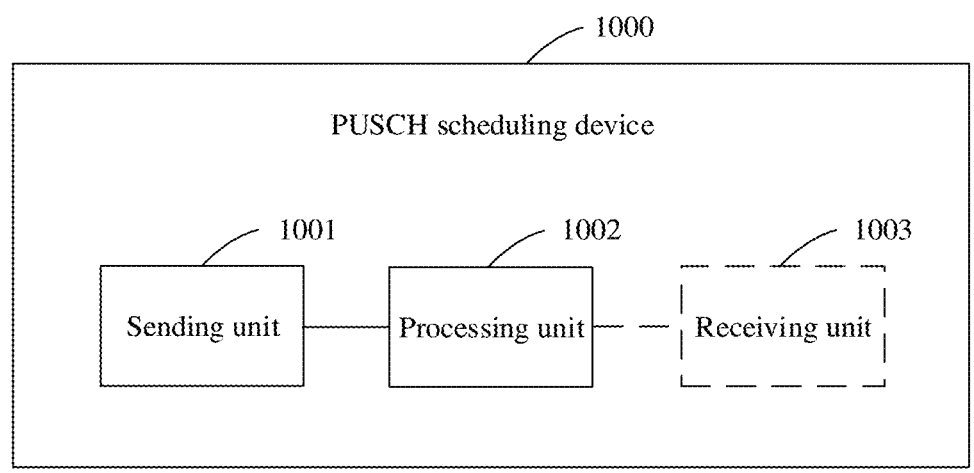
FIG. 10 is a schematic structural diagram of a PUSCH scheduling device according to an embodiment of this application.

Based on the foregoing embodiments, an embodiment of this application provides a PUSCH scheduling device. The PUSCH scheduling device is configured to implement the PUSCH transmission method shown in FIG. 4. Referring to FIG. 10, the PUSCH scheduling device 1000 includes a sending unit 1001 and a processing unit 1002.

The sending unit 1001 is configured to send a machine physical downlink control channel MPDCCH, where the MPDCCH includes a quantity of repeated sending times of the MPDCCH and timing indication information, a resource allocation granularity of a PUSCH corresponding to the MPDCCH is a target resource unit, and a quantity of subcarriers occupied by the target resource unit in frequency domain is less than or equal to 12.

The processing unit 1002 is configured to control the sending unit 1001 to send the MPDCCH.

Optionally, a first mapping relationship is configured in the PUSCH scheduling device and a terminal that receives the MPDCCH, the first mapping relationship is a correspondence between a time domain location of a first subframe and a location offset when the resource allocation granularity of the PUSCH is an RU, the location offset is an offset of a time domain location of a second subframe relative to the time domain location of the first subframe, the first subframe is the last subframe that carries the MPDCCH, and the second subframe is a start subframe that carries the physical uplink shared channel PUSCH corresponding to the MPDCCH.

The timing indication information is used to indicate the terminal to determine the time domain location of the second subframe based on the first mapping relationship.

Optionally, the timing indication information is first location offset information, the first location offset information indicates an offset of a time domain location of a second subframe relative to a time domain location of a third subframe, and the third subframe is a start subframe that is for sending the PUSCH and that is determined based on a time domain location of a first subframe when the resource allocation granularity of the PUSCH is a resource block RB.

Before the sending unit 1001 sends the MPDCCH, the processing unit 1002 is further configured to: determine the time domain location of the first subframe based on the quantity of repeated sending times of the MPDCCH, determine the time domain location of the third subframe based on the time domain location of the first subframe, and determine the first location offset information based on the time domain location of the second subframe and the time domain location of the third subframe.

Optionally, the timing indication information includes second location offset information, and the second location offset information indicates an offset of a time domain location of a second subframe relative to a time domain location of a first subframe.

Before the sending unit 1001 sends the MPDCCH, the processing unit 1002 is further configured to: determine the time domain location of the first subframe based on the quantity of repeated sending times of the MPDCCH, and determine the second location offset information based on the time domain location of the second subframe and the time domain location of the first subframe.

Optionally, the PUSCH scheduling device 1000 further includes a receiving unit 1003, configured to receive the PUSCH corresponding to the MPDCCH.

Optionally, the target resource unit includes one uplink subframe or a plurality of consecutive uplink subframes in time domain.

Optionally, a second mapping relationship is configured in the PUSCH scheduling device and the terminal that receives the MPDCCH, and the second mapping relationship is a mapping relationship between an uplink-downlink configuration manner and a resource unit.

When an uplink-downlink configuration manner agreed on between the terminal that receives the MPDCCH and the PUSCH scheduling device corresponds to one resource unit in the second mapping relationship, the target resource unit is the resource unit corresponding to the uplink-downlink configuration manner agreed on between the terminal that receives the MPDCCH and the PUSCH scheduling device in the second mapping relationship; or when an uplink-downlink configuration manner agreed on between the terminal that receives the MPDCCH and the PUSCH scheduling device corresponds to a plurality of resource units in the second mapping relationship, the target resource unit is a resource unit selected by the PUSCH scheduling device from the plurality of resource units and notified to the terminal that receives the MPDCCH.

Optionally, the second mapping relationship meets the following table:

| Time division duplex TDD uplink-downlink configuration manner | Resource unit |
| --- | --- |
| 0 | First resource unit and/or second resource unit |
| 1 | First resource unit and/or third resource unit |
| 2 | First resource unit |
| 3 | First resource unit and/or second resource unit |
| 4 | First resource unit and/or second resource unit |
| 5 | First resource unit |
| 6 | First resource unit |

The first resource unit occupies one subframe in time domain, the second resource unit occupies three subframes in time domain, and the third resource unit occupies two subframes in time domain.

Optionally, a quantity M of subframes occupied by the target resource unit in time domain and a quantity N of subcarriers occupied by the target resource unit in frequency domain meet |M×N−12|≤a, where M and N are positive integers, and a is an integer greater than or equal to 0.

Figure 11:
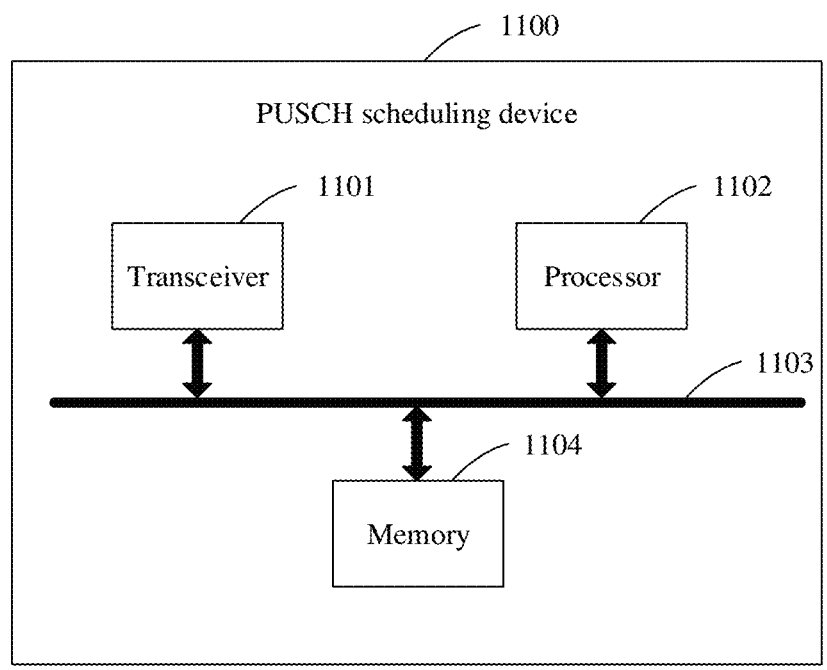
FIG. 11 is a schematic structural diagram of a PUSCH scheduling device according to an embodiment of this application.

Based on the foregoing embodiments, an embodiment of this application provides a PUSCH scheduling device. The PUSCH scheduling device is configured to implement the PUSCH transmission method shown in FIG. 4 and has the functions of the PUSCH scheduling 1100 shown in FIG. 10. Referring to FIG. 11, the PUSCH scheduling device 1100 includes a transceiver 1101 and a processor 1102. The transceiver 1101 and the processor 1102 are connected to each other.

The transceiver 1101 is configured to send a machine physical downlink control channel MPDCCH, where the MPDCCH includes a quantity of repeated sending times of the MPDCCH and timing indication information, a resource allocation granularity of a PUSCH corresponding to the MPDCCH is a target resource unit, and a quantity of subcarriers occupied by the target resource unit in frequency domain is less than or equal to 12.

The processor 1102 is configured to control the transceiver 1101 to send the MPDCCH.

Optionally, the processor 1102 may be a CPU, an NP, or a combination of the CPU and the NP. The processor 1102 may further include a hardware chip. The hardware chip may be an ASIC, a PLD, or a combination thereof. The PLD may be a CPLD, an FPGA, a GAL, or any combination thereof.

Optionally, the processor 1102 and the transceiver 1101 may be connected to each other through the bus 1103. The bus 1103 may be a PCI bus, an EISA bus, or the like. The bus 1103 may be classified into an address bus, a data bus, a control bus, and the like. For ease of representation, only one thick line is used to represent the bus in FIG. 11, but this does not mean that there is only one bus or only one type of bus.

Optionally, the PUSCH scheduling device 1100 further includes a memory 1104, configured to store a first mapping relationship, where the first mapping relationship is a correspondence between a time domain location of a first subframe and a location offset when the resource allocation granularity of the PUSCH is an RU, the location offset is an offset of a time domain location of a second subframe relative to the time domain location of the first subframe, the first subframe is the last subframe that carries the MPDCCH, and the second subframe is a start subframe that carries the physical uplink shared channel PUSCH corresponding to the MPDCCH.

The timing indication information is used to indicate the terminal to determine the time domain location of the second subframe based on the first mapping relationship.

Optionally, the memory 1104 may include a volatile memory, for example, a RAM. The memory 1104 may alternatively include a non-volatile memory, for example, a flash memory, an HDD, or an SSD. The memory 1104 may alternatively include a combination of the foregoing memories.

Optionally, the memory 1104 may include a RAM, or may include a non-volatile memory, for example, at least one magnetic disk storage.

Optionally, the timing indication information includes first location offset information, the first location offset information indicates an offset of a time domain location of a second subframe relative to a time domain location of a third subframe, and the third subframe is a start subframe that is for sending the PUSCH and that is determined based on the time domain location of the first subframe when the resource allocation granularity of the PUSCH is a resource block RB.

Before the transceiver 1101 sends the MPDCCH, the processor 1102 is further configured to: determine the time domain location of the first subframe based on the quantity of repeated sending times of the MPDCCH, determine the time domain location of the third subframe based on the time domain location of the first subframe, and determine the first location offset information based on the time domain location of the second subframe and the time domain location of the first subframe.

Optionally, the timing indication information is second location offset information, and the second location offset information indicates an offset of a time domain location of a second subframe relative to a time domain location of a first subframe.

Before the transceiver 1101 sends the MPDCCH, the processor 1102 is further configured to: determine the location of the first subframe based on the quantity of repeated sending times of the MPDCCH, and determine the second location offset information based on the time domain location of the second subframe and the time domain location of the first subframe.

Optionally, the target resource unit includes one uplink subframe or a plurality of consecutive uplink subframes in time domain.

Optionally, the memory 1104 is further configured to store a second mapping relationship, where the second mapping relationship is a mapping relationship between an uplink-downlink configuration manner and a resource unit.

When an uplink-downlink configuration manner agreed on between the terminal that receives the MPDCCH and the PUSCH scheduling device corresponds to one resource unit in the second mapping relationship, the target resource unit is the resource unit corresponding to the uplink-downlink configuration manner agreed on between the terminal that receives the MPDCCH and the PUSCH scheduling device in the second mapping relationship; or when an uplink-downlink configuration manner agreed on between the terminal that receives the MPDCCH and the PUSCH scheduling device corresponds to a plurality of resource units in the second mapping relationship, the target resource unit is a resource unit selected by the PUSCH scheduling device from the plurality of resource units and notified to the terminal that receives the MPDCCH.

Optionally, the transceiver 1101 is further configured to receive a PUSCH corresponding to the MPDCCH.

Optionally, the second mapping relationship meets the following table:

| Time division duplex TDD uplink-downlink configuration manner | Resource unit |
| --- | --- |
| 0 | First resource unit and/or second resource unit |
| 1 | First resource unit and/or third resource unit |
| 2 | First resource unit |
| 3 | First resource unit and/or second resource unit |
| 4 | First resource unit and/or second resource unit |
| 5 | First resource unit |
| 6 | First resource unit |

The first resource unit occupies one subframe in time domain, the second resource unit occupies three subframes in time domain, and the third resource unit occupies two subframes in time domain.

Optionally, a quantity M of subframes occupied by the target resource unit in time domain and a quantity N of subcarriers occupied by the target resource unit in frequency domain meet $|M \times N - 12| \leq a$, where M and N are positive integers, and a is an integer greater than or equal to 0.

The embodiments of this application provide the PUSCH scheduling device. The PUSCH scheduling device may send the MPDCCH including the quantity of repeated sending times of the MPDCCH and the timing indication information to the terminal, so that the terminal can determine, based on the MPDCCH, the time domain location of the start subframe that carries the PUSCH corresponding to the MPDCCH, so that the time domain location of the start subframe that carries the PUSCH corresponding to the MPDCCH is the same as a time domain location of the $1^{st}$ subframe occupied by the target RU in time domain, and the terminal can fully use subframes occupied by the target RU to transmit the PUSCH corresponding to the MPDCCH, to ensure transmission quality of data carried on the PUSCH corresponding to the MPDCCH.

Figure 12:
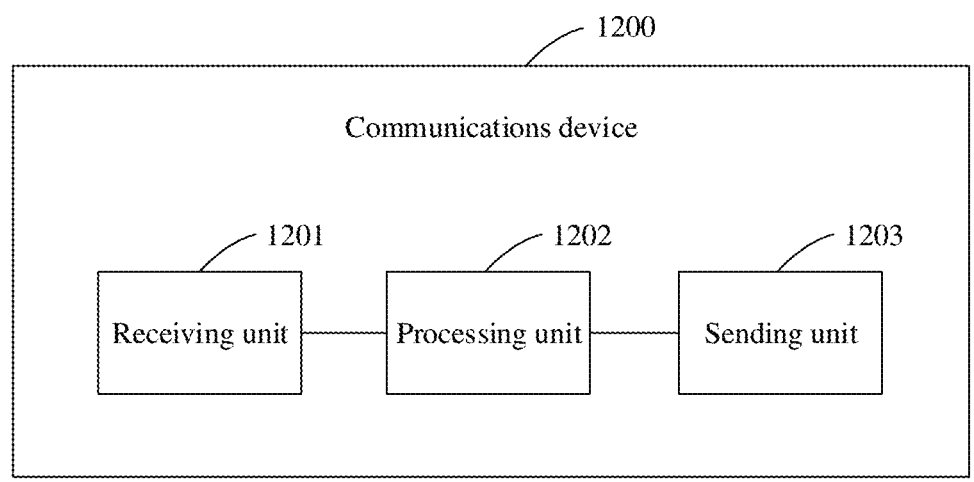
FIG. 12 is a schematic structural diagram of another communications device according to an embodiment of this application.

Based on the foregoing embodiments, an embodiment of this application provides a communications device. The terminal is configured to implement the PUSCH transmission method shown in FIG. 7. Referring to FIG. 12, the communications device 1200 includes a receiving unit 1201, a processing unit 1202, and a sending unit 1203.

The receiving unit 1201 is configured to receive resource unit type indication information.

The processing unit 1202 is configured to determine, based on the resource unit type indication information, a type of a target resource unit RU that carries a physical uplink shared channel PUSCH, where the RU corresponding to the target RU type includes one uplink subframe or a plurality of consecutive uplink subframes in time domain, and a quantity of subcarriers occupied by the resource unit corresponding to the target RU type in frequency domain is less than or equal to 12.

The sending unit 1203 is configured to send the PUSCH based on the target RU type.

Optionally, a mapping relationship between an uplink-downlink subframe configuration manner and a resource unit type is configured in the terminal.

If uplink-downlink configuration manners one-to-one correspond to resource unit types in the mapping relationship, and the resource unit type indication information includes a target uplink-downlink subframe configuration manner, when determining the target resource unit RU type based on the resource unit type indication information, the processing unit 1202 is specifically configured to determine, as the target RU type, a resource unit type corresponding to the target uplink-downlink subframe configuration manner in the mapping relationship.

Optionally, if any uplink-downlink configuration manner corresponds to a plurality of resource unit types in the mapping relationship, and the resource unit type indication information includes a target uplink-downlink subframe configuration manner and target resource unit type indication information, when determining the target resource unit RU type based on the resource unit type indication information, the processing unit 1202 is specifically configured to: determine, based on the target uplink-downlink subframe configuration manner and the mapping relationship, RU types corresponding to the target uplink-downlink subframe configuration manner, and determine, as the target RU type, an RU type that is in the RU types corresponding to the target uplink-downlink subframe configuration manner and that is indicated by the target resource unit type indication information.

Optionally, the mapping relationship meets the following table:

| Time division duplex TDD uplink-downlink configuration manner | Resource unit type |
| --- | --- |
| 0 | First RU type and/or second RU type |
| 1 | First RU type and/or third RU type |
| 2 | First RU type |
| 3 | First RU type and/or second RU type |
| 4 | First RU type and/or second RU type |
| 5 | First RU type |
| 6 | First RU type |

An RU corresponding to the first RU type occupies one subframe in time domain, an RU corresponding to the second RU type occupies three subframes in time domain, and an RU corresponding to the third RU type occupies two subframes in time domain.

Optionally, a quantity M of subframes occupied by the RU corresponding to target RU type in time domain and a quantity N of subcarriers occupied by the RU corresponding to target RU type in frequency domain meet $|M \times N - 12| \leq a$, where M and N are positive integers, and a is an integer greater than or equal to 0.

Optionally, a start subframe of the RU corresponding to the target RU type is the first uplink subframe in a system frame or the first uplink subframe in a slot.

Figure 13:
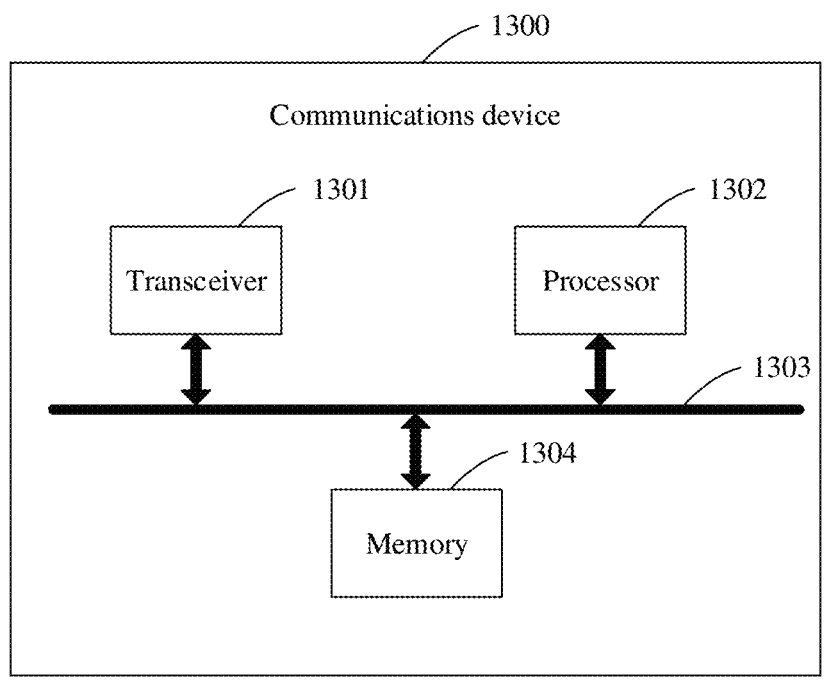
FIG. 13 is a schematic structural diagram of another communications device according to an embodiment of this application.

Based on the foregoing embodiments, an embodiment of this application provides a communications device. The communications device is configured to implement the PUSCH transmission method shown in FIG. 7 and has the functions of the communications device 1200 shown in FIG. 12. Referring to FIG. 13, the communications device 1300 includes a transceiver 1301 and a processor 1302. The transceiver 1301 and the processor 1302 are connected to each other.

The transceiver 1301 is configured to receive resource unit type indication information and send a PUSCH under control of the processor 1302.

The processor 1302 is configured to: determine, based on the resource unit type indication information, a type of a target resource unit RU that carries a physical uplink shared channel PUSCH, and control the transceiver 1301 to send the PUSCH based on the target RU type, where the RU corresponding to the target RU type includes one uplink subframe or a plurality of consecutive uplink subframes in time domain, and a quantity of subcarriers occupied by the resource unit corresponding to the target RU type in frequency domain is less than or equal to 12.

Optionally, the processor 1302 may be a CPU, an NP, or a combination of the CPU and the NP. The processor 1302 may further include a hardware chip. The hardware chip may be an ASIC, a PLD, or a combination thereof. The PLD may be a CPLD, an FPGA, a GAL, or any combination thereof.

Optionally, the processor 1302 and the transceiver 1301 may be connected to each other through the bus 1303. The bus 1303 may be a PCI bus, an EISA bus, or the like. The bus 1303 may be classified into an address bus, a data bus, a control bus, and the like. For ease of representation, only one thick line is used to represent the bus in FIG. 13, but this does not mean that there is only one bus or only one type of bus.

Optionally, the communications device further includes a processor 1304, configured to store a preconfigured mapping relationship between an uplink-downlink subframe configuration manner and a resource unit type. If uplink-downlink configuration manners one-to-one correspond to resource unit types in the mapping relationship, and the resource unit type indication information includes a target uplink-downlink subframe configuration manner, when determining the target resource unit RU type based on the resource unit type indication information, the processor 1302 is specifically configured to determine, as the target RU type, a resource unit type corresponding to the target uplink-downlink subframe configuration manner in the mapping relationship.

Optionally, the memory 1304 may include a volatile memory, for example, a RAM. The memory 1304 may alternatively include a non-volatile memory, for example, a flash memory, an HDD, or an SSD. The memory 1304 may alternatively include a combination of the foregoing memories.

Optionally, the memory 1304 may include a RAM, or may include a non-volatile memory, for example, at least one magnetic disk storage.

Optionally, if any uplink-downlink configuration manner corresponds to a plurality of resource unit types in the mapping relationship, and the resource unit type indication information includes a target uplink-downlink subframe configuration manner and target resource unit type indication information, when determining the target resource unit RU type based on the resource unit type indication information, the processor 1302 is specifically configured to: determine, based on the target uplink-downlink subframe configuration manner and the mapping relationship, RU types corresponding to the target uplink-downlink subframe configuration manner, and determine, as the target RU type, an RU type that is in the RU types corresponding to the target uplink-downlink subframe configuration manner and that is indicated by the target resource unit type indication information.

Optionally, the mapping relationship meets the following table:

| Time division duplex TDD uplink-downlink configuration manner | Resource unit type |
| --- | --- |
| 0 | First RU type and/or second RU type |
| 1 | First RU type and/or third RU type |
| 2 | First RU type |
| 3 | First RU type and/or second RU type |
| 4 | First RU type and/or second RU type |
| 5 | First RU type |
| 6 | First RU type |

An RU corresponding to the first RU type occupies one subframe in time domain, an RU corresponding to the second RU type occupies three subframes in time domain, and an RU corresponding to the third RU type occupies two subframes in time domain.

Optionally, a quantity M of subframes occupied by the RU corresponding to target RU type in time domain and a quantity N of subcarriers occupied by the RU corresponding to target RU type in frequency domain meet $|M \times N - 12| \leq a$, where M and N are positive integers, and a is an integer greater than or equal to 0.

Optionally, a start subframe of the RU corresponding to the target RU type is the first uplink subframe in a system frame or the first uplink subframe in a slot.

The embodiments of this application provide a communications device. The terminal may determine the target resource unit type based on the received resource unit type indication information, and send the PUSCH by mapping the RU corresponding to the target RU type to one uplink subframe or a plurality of consecutive uplink subframes in a system frame in time domain. This can resolve a problem of an inaccurate channel estimation result caused by non-consecutive subframes included in a resource unit.

Figure 14:
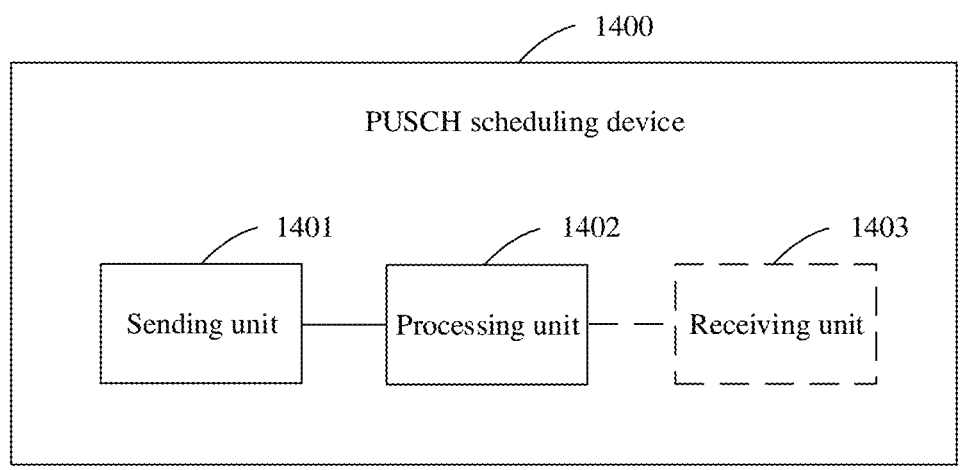
FIG. 14 is a schematic structural diagram of another PUSCH scheduling device according to an embodiment of this application.

Based on the foregoing embodiments, an embodiment of this application provides a PUSCH scheduling device. The PUSCH scheduling device is configured to implement the PUSCH transmission method shown in FIG. 7. Referring to FIG. 14, the PUSCH scheduling device 1400 includes a sending unit 1401 and a processing unit 1402.

The sending unit 1401 is configured to send resource unit type indication information, where the resource unit type indication information is used to determine a type of a target resource unit RU that carries a physical uplink shared channel PUSCH, where the RU corresponding to the target RU type includes one uplink subframe or a plurality of consecutive uplink subframes in time domain, and a quantity of subcarriers occupied by the resource unit corresponding to the target RU type in frequency domain is less than or equal to 1.

The processing unit 1402 is configured to control the sending unit 1401 to send the resource unit type indication information.

Optionally, the PUSCH scheduling device 1400 further includes a receiving unit 1403, configured to receive the PUSCH.

Optionally, a mapping relationship between an uplink-downlink subframe configuration manner and a resource unit type is configured in the PUSCH scheduling device and a terminal that receives the resource unit type indication information.

If uplink-downlink configuration manners one-to-one correspond to resource unit types in the mapping relationship, the resource unit type indication information includes a target uplink-downlink subframe configuration manner.

Optionally, if any uplink-downlink configuration manner corresponds to a plurality of resource unit types in the mapping relationship, the resource unit type indication information includes a target uplink-downlink subframe configuration manner and target resource unit type indication information.

Optionally, the mapping relationship meets the following table:

| Time division duplex TDD uplink-downlink configuration manner | Resource unit type |
| --- | --- |
| 0 | First RU type and/or second RU type |
| 1 | First RU type and/or third RU type |
| 2 | First RU type |
| 3 | First RU type and/or second RU type |
| 4 | First RU type and/or second RU type |
| 5 | First RU type |
| 6 | First RU type |

An RU corresponding to the first RU type occupies one subframe in time domain, an RU corresponding to the second RU type occupies three subframes in time domain, and an RU corresponding to the third RU type occupies two subframes in time domain.

Optionally, a quantity M of subframes occupied by the RU corresponding to target RU type in time domain and a quantity N of subcarriers occupied by the RU corresponding to target RU type in frequency domain meet $|M \times N - 12| \leq a$, where M and N are positive integers, and a is an integer greater than or equal to 0.

Optionally, a start subframe of the RU corresponding to the target RU type is the first uplink subframe in the system frame or the first uplink subframe in a slot.

Figure 15:
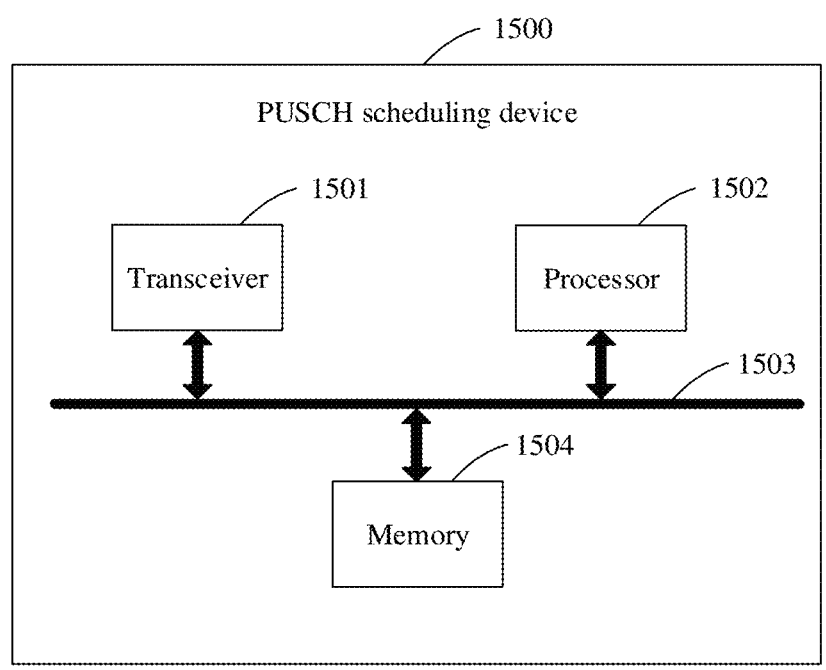
FIG. 15 is a schematic structural diagram of another PUSCH scheduling device according to an embodiment of this application.

Based on the foregoing embodiments, an embodiment of this application provides a PUSCH scheduling device. The PUSCH scheduling device is configured to implement the PUSCH transmission method shown in FIG. 7 and has the functions of the PUSCH scheduling 1400 shown in FIG. 14. Referring to FIG. 15, the PUSCH scheduling device 1500 includes a transceiver 1501 and a processor 1502. The transceiver 1501 and the processor 1502 are connected to each other.

The transceiver 1501 is configured to send resource unit type indication information, where the resource unit type indication information is used to determine a type of a target resource unit RU that carries a physical uplink shared channel PUSCH, where the RU corresponding to the target RU type includes one uplink subframe or a plurality of consecutive uplink subframes in time domain, and a quantity of subcarriers occupied by the resource unit corresponding to the target RU type in frequency domain is less than or equal to 1.

The processor 1502 is configured to control the transceiver 1501 to send the resource unit type indication information.

Optionally, the processor 1502 may be a CPU, an NP, or a combination of the CPU and the NP. The processor 1502 may further include a hardware chip. The hardware chip may be an ASIC, a PLD, or a combination thereof. The PLD may be a CPLD, an FPGA, a GAL, or any combination thereof.

Optionally, the processor 1502 and the transceiver 1501 may be connected to each other through the bus 1503. The bus 1503 may be a PCI bus, an EISA bus, or the like. The bus 1503 may be classified into an address bus, a data bus, a control bus, and the like. For ease of representation, only one thick line is used to represent the bus in FIG. 15, but this does not mean that there is only one bus or only one type of bus.

Optionally, the PUSCH scheduling device further includes a memory 1504, configured to store a preconfigured mapping relationship between an uplink-downlink subframe configuration manner and a resource unit type.

If uplink-downlink configuration manners one-to-one correspond to resource unit types in the mapping relationship, the resource unit type indication information includes a target uplink-downlink subframe configuration manner.

Optionally, the memory 1504 may include a volatile memory, for example, a RAM. The memory 1504 may alternatively include a non-volatile memory, for example, a flash memory, an HDD, or an SSD. The memory 1104 may alternatively include a combination of the foregoing memories.

Optionally, the memory 1504 may include a RAM, or may include a non-volatile memory, for example, at least one magnetic disk storage.

Optionally, the transceiver is further configured to receive the PUSCH.

Optionally, if any uplink-downlink configuration manner corresponds to a plurality of resource unit types in the mapping relationship, the resource unit type indication information includes a target uplink-downlink subframe configuration manner and target resource unit type indication information.

Optionally, the mapping relationship meets the following table:

| Time division duplex TDD uplink-downlink configuration manner | Resource unit type |
| --- | --- |
| 0 | First RU type and/or second RU type |
| 1 | First RU type and/or third RU type |
| 2 | First RU type |
| 3 | First RU type and/or second RU type |
| 4 | First RU type and/or second RU type |
| 5 | First RU type |
| 6 | First RU type |

An RU corresponding to the first RU type occupies one subframe in time domain, an RU corresponding to the second RU type occupies three subframes in time domain, and an RU corresponding to the third RU type occupies two subframes in time domain.

Optionally, a quantity M of subframes occupied by the RU corresponding to target RU type in time domain and a quantity N of subcarriers occupied by the RU corresponding to target RU type in frequency domain meet $|M \times N - 12| \leq a$, where M and N are positive integers, and a is an integer greater than or equal to 0.

Optionally, a start subframe of the RU corresponding to the target RU type is the first uplink subframe in the system frame or the first uplink subframe in a slot.

The embodiments of this application provide the PUSCH scheduling device. The PUSCH scheduling device may send the resource unit type indication information to the terminal, so that the terminal determines the target resource unit type based on the received resource unit type indication information, and send the PUSCH by mapping the RU corresponding to the target RU type to one uplink subframe or a plurality of consecutive uplink subframes in a system frame in time domain. This can resolve a problem of an inaccurate channel estimation result caused by nonconsecutive subframes included in a resource unit.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method, comprising:
   receiving, by a terminal, a machine physical downlink control channel (MPDCCH), wherein the MPDCCH comprises a quantity of repeated sending times of the MPDCCH and timing indication information;
   determining, by the terminal, a time domain location of a first subframe based on the quantity of repeated sending times of the MPDCCH, wherein the first subframe is a last subframe that carries the MPDCCH;
   determining, by the terminal, a time domain location of a second subframe based on the timing indication information and the time domain location of the first subframe, wherein the second subframe is a start subframe that carries a physical uplink shared channel (PUSCH) corresponding to the MPDCCH, a resource allocation granularity of the PUSCH corresponding to the MPDCCH is a target resource unit, and a quantity of subcarriers occupied by the target resource unit in frequency domain is less than or equal to 12; and
   sending, by the terminal in the second subframe based on the time domain location of the second subframe, the PUSCH corresponding to the MPDCCH; and
   wherein a quantity M of subframes occupied by the target resource unit in time domain and a quantity N of the subcarriers occupied by the target resource unit in frequency domain meet |M×N−12|≤a, wherein M and N are positive integers, and a is an integer greater than or equal to zero (0).

2. The method according to claim 1, wherein the timing indication information comprises first location offset information, the first location offset information indicates an offset of the time domain location of the second subframe relative to a time domain location of a third subframe, and the third subframe is a start subframe for sending the PUSCH that is determined based on the time domain location of the first subframe when the resource allocation granularity of the PUSCH is a resource block (RB); and
   wherein determining, by the terminal, the time domain location of the second subframe based on the timing indication information and the time domain location of the first subframe comprises:
      determining, by the terminal, the time domain location of the third subframe based on the time domain location of the first subframe; and
      determining, by the terminal, the time domain location of the second subframe based on the first location offset information and the time domain location of the third subframe.

3. The method according to claim 1, wherein the timing indication information comprises second location offset information, and the second location offset information indicates an offset of the time domain location of the second subframe relative to the time domain location of the first subframe; and
   wherein determining, by the terminal, the time domain location of the second subframe based on the timing indication information and the time domain location of the first subframe comprises:
      determining, by the terminal, the time domain location of the second subframe based on the time domain location of the first subframe and the second location offset information.

4. The method according to claim 1, wherein the timing indication information indicates to the terminal to determine the time domain location of the second subframe based on a first mapping relationship, the first mapping relationship is a correspondence between the time domain location of the first subframe and a location offset when the resource allocation granularity of the PUSCH is a resource unit (RU), and the location offset is an offset of the time domain location of the second subframe relative to the time domain location of the first subframe; and
   wherein determining, by the terminal, the time domain location of the second subframe based on the time domain location of the first subframe and the timing indication information comprises:
      determining, by the terminal, the time domain location of the second subframe based on the time domain location of the first subframe and the first mapping relationship.

5. The method according to claim 1, wherein the target resource unit comprises one uplink subframe or a plurality of consecutive uplink subframes in time domain.

6. The method according to claim 1, wherein a second mapping relationship is configured in the terminal and a PUSCH scheduling device, the second mapping relationship is between an uplink-downlink configuration manner and a resource unit, and the PUSCH scheduling device sends the MPDCCH; and
   when an uplink-downlink configuration manner agreed on between the terminal and the PUSCH scheduling device corresponds to one resource unit in the second mapping relationship, the target resource unit is the one resource unit corresponding to the uplink-downlink configuration manner agreed on between the terminal and the PUSCH scheduling device in the second mapping relationship; or
   when an uplink-downlink configuration manner agreed on between the terminal and the PUSCH scheduling device corresponds to a plurality of resource units in the second mapping relationship, the target resource unit is selected by the PUSCH scheduling device from the plurality of resource units and notified to the terminal.

7. The method according to claim 6, wherein the second mapping relationship meets the following table:

| Time division duplex (TDD) uplink-downlink configuration manner | Resource unit |
|---|---|
| 0 | First resource unit or second resource unit |
| 1 | First resource unit or third resource unit |
| 2 | First resource unit |
| 3 | First resource unit or second resource unit |
| 4 | First resource unit or second resource unit |
| 5 | First resource unit |
| 6 | First resource unit | wherein the first resource unit occupies one subframe in time domain, the second resource unit occupies three subframes in time domain, and the third resource unit occupies two subframes in time domain.

8. A device, comprising:
a transceiver, configured to receive a machine physical downlink control channel (MPDCCH), wherein the MPDCCH comprises a quantity of repeated sending times of the MPDCCH and timing indication information, wherein the timing indication information comprises first location offset information, the first location offset information indicates an offset of a time domain location of a second subframe relative to a time domain location of a third subframe, the second subframe is a start subframe that carries a physical uplink shared channel (PUSCH) corresponding to the MPDCCH, and the third subframe is a start subframe for sending the PUSCH corresponding to the MPDCCH that is determined based on the time domain location of a first subframe when a resource allocation granularity of the PUSCH is a resource block (RB);
a processor; and
a non-transitory computer-readable storage medium storing a program to be executed by the processor, the program including instructions for:
  determining a time domain location of a first subframe based on the quantity of repeated sending times of the MPDCCH;
  determining a time domain location of the second subframe based on the timing indication information and the time domain location of the first subframe, wherein determining the time domain location of the second subframe based on the timing indication information and the time domain location of the first subframe comprises:
    determining the time domain location of the third subframe based on the time domain location of the first subframe; and
    determining the time domain location of the second subframe based on the first location offset information and the time domain location of the third subframe; and
  control the transceiver to send, in the second subframe based on the time domain location of the second subframe, the PUSCH corresponding to the MPDCCH, wherein a resource allocation granularity of the PUSCH corresponding to the MPDCCH is a target resource unit, and a quantity of subcarriers occupied by the target resource unit in frequency domain is less than or equal to 12; and
wherein the transceiver is further configured to send, in the second subframe, the PUSCH corresponding to the MPDCCH.

9. The device according to claim 8, wherein the target resource unit comprises one uplink subframe or a plurality of consecutive uplink subframes in time domain.

10. The device according to claim 8, wherein a quantity M of subframes occupied by the target resource unit in time domain and a quantity N of subcarriers occupied by the target resource unit in frequency domain meet $|M\times N-12|\leq a$, wherein M and N are positive integers, and a is an integer greater than or equal to zero (0).

11. The device according to claim 8, wherein the device is a terminal device, and the MPDCCH is received from another terminal device.

12. The device according to claim 8, wherein the device is a terminal device, and the MPDCCH is received from a network device.

13. The device according to claim 8, wherein the quantity of repeated sending times of the MPDCCH and the timing indication information is carried in downlink control information (DCI).

14. The device according to claim 8, wherein the first location offset information indicates a first absolute location offset, and the first absolute location offset is a total quantity of subframes from the third subframe to the second subframe.

15. The device according to claim 8, wherein the first location offset information indicates a first relative location offset, and the first relative position offset is a quantity of valid subframes from the third subframe to the second subframe.

16. A physical uplink shared channel (PUSCH) scheduling device, comprising:
a transceiver, configured to send a machine physical downlink control channel (MPDCCH), wherein the MPDCCH comprises a quantity of repeated sending times of the MPDCCH and timing indication information, a resource allocation granularity of a PUSCH corresponding to the MPDCCH is a target resource unit, and a quantity of subcarriers occupied by the target resource unit in frequency domain is less than or equal to 12, and wherein the timing indication information is first location offset information, the first location offset information indicates an offset of a time domain location of a second subframe relative to a time domain location of a third subframe, the third subframe is a start subframe for sending the PUSCH corresponding to the MPDCCH that is determined based on a time domain location of a first subframe when the resource allocation granularity of the PUSCH is a resource block (RB), the first subframe is a last subframe that carries the MPDCCH, and the second subframe is a start subframe that carries the PUSCH corresponding to the MPDCCH;
a processor; and
a non-transitory computer-readable storage medium storing a program to be executed by the processor, the program including instructions for:
  determining the time domain location of the first subframe based on the quantity of repeated sending times of the MPDCCH;

determining the time domain location of the third subframe based on the time domain location of the first subframe; and determining the first location offset information based on the time domain location of the second subframe and the time domain location of the third subframe; and controlling the transceiver to send the MPDCCH.

17. The PUSCH scheduling device according to claim 16, wherein the PUSCH scheduling device is a terminal device.

18. The PUSCH scheduling device according to claim 16, wherein the quantity of repeated sending times of the MPDCCH and the timing indication information is carried in downlink control information (DCI).

19. The PUSCH scheduling device according to claim 16, wherein the first location offset information indicates a first absolute location offset, and the first absolute location offset is a total quantity of subframes from the third subframe to the second subframe.

20. The PUSCH scheduling device according to claim 16, wherein the first location offset information indicates a first relative location offset, and the first relative position offset is a quantity of valid subframes from the third subframe to the second subframe.

* * * * *